US012730753B2

(12) United States Patent
Kim et al.

(10) Patent No.: US 12,730,753 B2
(45) Date of Patent: Sep. 8, 2026

(54) ELECTRONIC DEVICE, MEMORY DEVICE, AND OPERATING METHOD OF MEMORY DEVICE

(71) Applicant: SAMSUNG ELECTRONICS CO., LTD., Suwon-si (KR)

(72) Inventors: Moongyung Kim, Suwon-si (KR); Youngsik Eom, Suwon-si (KR); Donghyeon Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/802,266

(22) Filed: Aug. 13, 2024

(65) Prior Publication Data

US 2025/0077427 A1 Mar. 6, 2025

(30) Foreign Application Priority Data

Aug. 31, 2023 (KR) ........................ 10-2023-0115275
Dec. 1, 2023 (KR) ........................ 10-2023-0172727

(51) Int. Cl.
*G06F 12/08* (2016.01)
*G06F 12/0806* (2016.01)
*G06F 12/0891* (2016.01)

(52) U.S. Cl.
CPC ...... *G06F 12/0806* (2013.01); *G06F 12/0891* (2013.01)

(58) Field of Classification Search
CPC .. G06F 12/08; G06F 12/0864; G06F 12/0806; G06F 12/0846; G06F 1/3275;
(Continued)

(56) References Cited

U.S. PATENT DOCUMENTS 6,845,432 B2 1/2005 Maiyuran et al.
7,443,759 B1 10/2008 Rowlands et al.
(Continued)

FOREIGN PATENT DOCUMENTS

EP 2569680 A1 * 3/2013
KR 10-2011-0134917 12/2011
(Continued)

OTHER PUBLICATIONS

J. M. Tendler, J. S. Dodson, J. S. Fields, H. Le and B. Sinharoy, "POWER4 system microarchitecture," in IBM Journal of Research and Development, vol. 46, No. 1, pp. 5-25, Jan. 2002.*
(Continued)

*Primary Examiner* — Pierre Michel Bataille
(74) *Attorney, Agent, or Firm* — Fish & Richardson P.C.

(57) ABSTRACT

The present disclosure relates to electronic devices, memory devices, and memory device operating methods. An example memory device includes a first bank, a second bank, a cache controller, and a way selector. The first bank includes a first way group configured to receive power and to store a first cache line corresponding to a first address. The second bank includes a second way group configured to receive power and to store a second cache line corresponding to a second address. The cache controller is configured to output a second target indicating the second bank based on a power control signal indicating to stop supplying the power to the first bank and the first address. The way selector is configured to transmit the first address to the second bank based on the first address, the power control signal, and the second target.

20 Claims, 22 Drawing Sheets

(58) Field of Classification Search
CPC ............. G06F 12/0895; G06F 12/0891; G06F 2212/1028; G06F 2212/50; G06F 2212/502
See application file for complete search history.

(56) References Cited

U.S. PATENT DOCUMENTS

| | | | | |
|---|---|---|---|---|
| 7,904,658 | B2 | 3/2011 | Abadeer et al. | |
| 8,156,357 | B2 * | 4/2012 | Zhang | G06F 12/0864 713/320 |
| 8,352,683 | B2 * | 1/2013 | Cohen | G06F 12/0864 713/324 |
| 8,589,629 | B2 | 11/2013 | Owen et al. | |
| 8,990,505 | B1 * | 3/2015 | Jamil | G06F 12/0895 711/128 |
| 9,128,842 | B2 | 9/2015 | Moses et al. | |
| 10,120,809 | B2 | 11/2018 | Arellano et al. | |
| 10,795,823 | B2 | 10/2020 | Ramanujan et al. | |
| 11,507,516 | B2 | 11/2022 | Roberts et al. | |
| 11,656,997 | B2 | 5/2023 | Gholkar et al. | |
| 2012/0284462 | A1 * | 11/2012 | Licht | G06F 9/3814 711/128 |
| 2018/0356874 | A1 * | 12/2018 | Lai | G06F 1/3287 |

FOREIGN PATENT DOCUMENTS

| | | | | |
|---|---|---|---|---|
| KR | 10-2015-0138399 | | 12/2015 | |
| WO | WO-2008009183 | A1 * | 1/2008 | G07C 9/23 |
| WO | WO-2011143256 | A1 * | 11/2011 | G06F 12/0864 |

OTHER PUBLICATIONS

Yen-Jen Chang, “An Ultra Low-Power TLB Design,” Proceedings of the Design Automation & Test in Europe Conference, Munich, Germany, 2006, pp. 1-6.*

J. H. Ahn, J. Leverich, R. Schreiber and N. P. Jouppi, “Multicore DIMM: an Energy Efficient Memory Module with Independently Controlled DRAMs,” in IEEE Computer Architecture Letters, vol. 8, No. 1, pp. 5-8, Jan.-Jun. 2009.*

M. Lewis and L. Brackenbury, “Exploiting typical DSP data access patterns and asynchrony for a low power multiported register bank,” Proceedings Seventh International Symposium on Asynchronous Circuits and Systems. ASYNC 2001, Salt Lake City, UT, USA, 2001, pp. 4-14.*

M. J. Garcia and B. K. Reynolds, “Single chip PCI bridge and memory controller for PowerPC microprocessors,” Proceedings 1994 IEEE International Conference on Computer Design: VLSI in Computers and Processors, Cambridge, MA, USA, 1994, pp. 409-412.*

M. Boettcher, G. Gabrielli, B. M. Al-Hashimi and D. Kershaw, “MALEC: A Multiple Access Low Energy Cache,” 2013 Design, Automation & Test in Europe Conference & Exhibition (DATE), Grenoble, France, 2013, pp. 368-373.*

* cited by examiner

Figure 1:
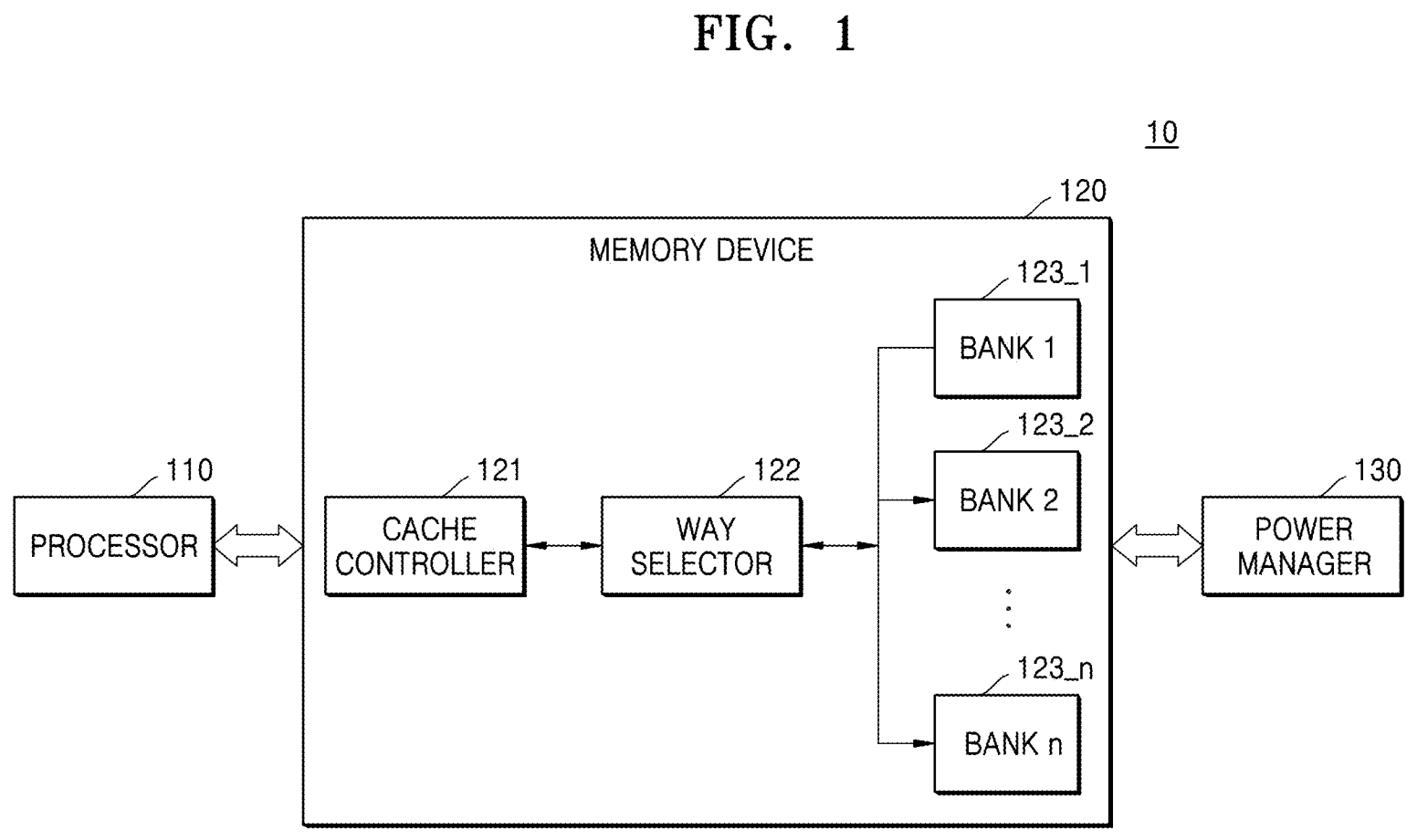

130
POWER MANAGER

120
MEMORY DEVICE

123_1
BANK 1

123_2
BANK 2

. . .

123_n
BANK n

122
WAY SELECTOR

121
CACHE CONTROLLER

110
PROCESSOR

Figure 2C:
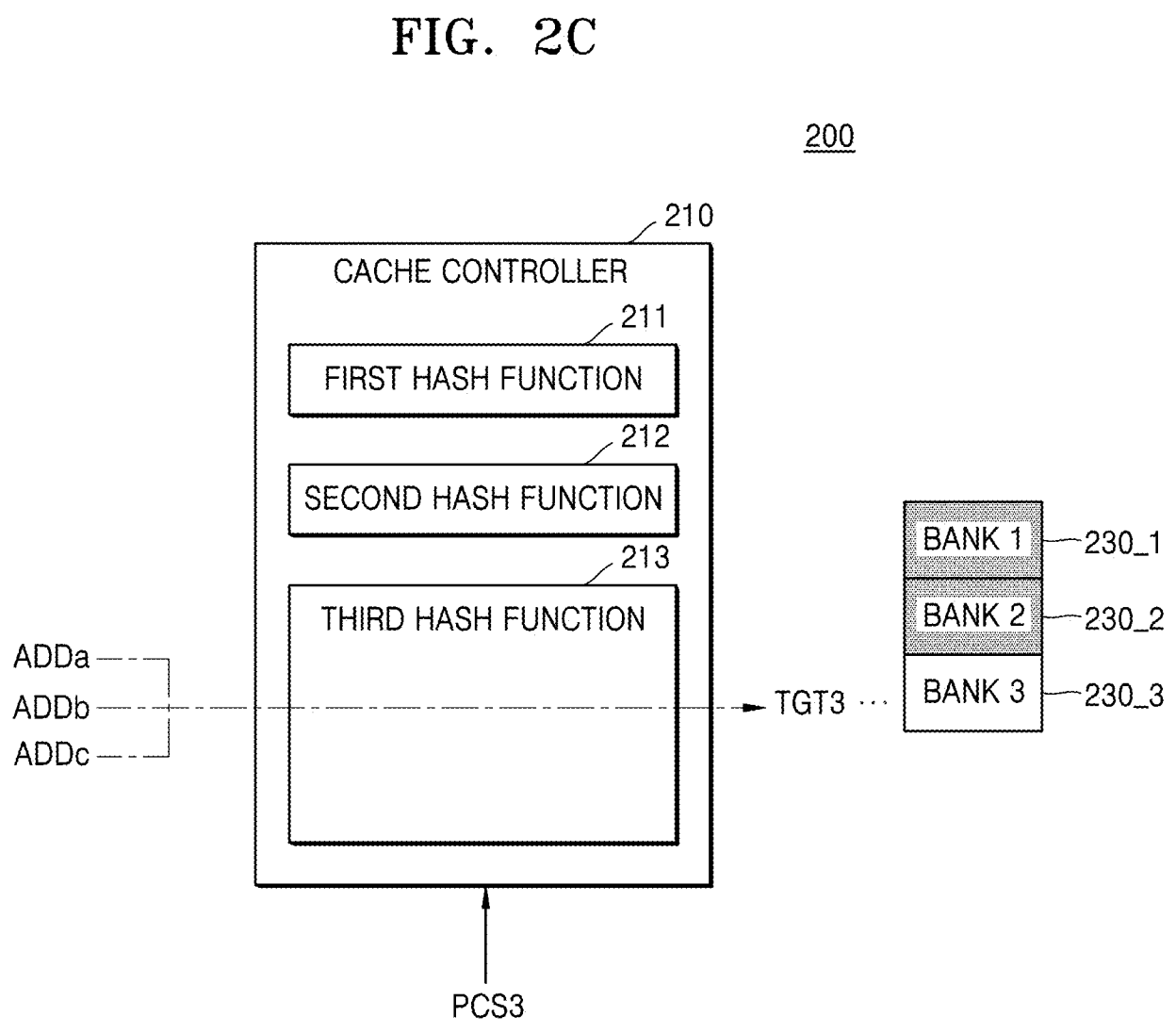

210
CACHE CONTROLLER
211
FIRST HASH FUNCTION
212
SECOND HASH FUNCTION
213
THIRD HASH FUNCTION

PCS3

ADDa
ADDb
ADDc

TGT3 ...

BANK 1 230_1
BANK 2 230_2
BANK 3 230_3

TXNa (including ADDai)

210 CACHE CONTROLLER

TXNa TGT1

220 WAY SELECTOR

PCS1

TXNa WI1

PWR

230_1 BANK 1

| WAY1 | TAG_a1 | DATA_a1 |
| --- | --- | --- |
| WAY2 | TAG_a2 | DATA_a2 |
| WAY3 | TAG_a3 | DATA_a3 |
| WAY4 | TAG_a4 | DATA_a4 |

PWR

230_2 BANK 2

| WAY1 | TAG_b1 | DATA_b1 |
| --- | --- | --- |
| WAY2 | TAG_b2 | DATA_b2 |
| WAY3 | TAG_b3 | DATA_b3 |
| WAY4 | TAG_b4 | DATA_b4 |

Figure 4:
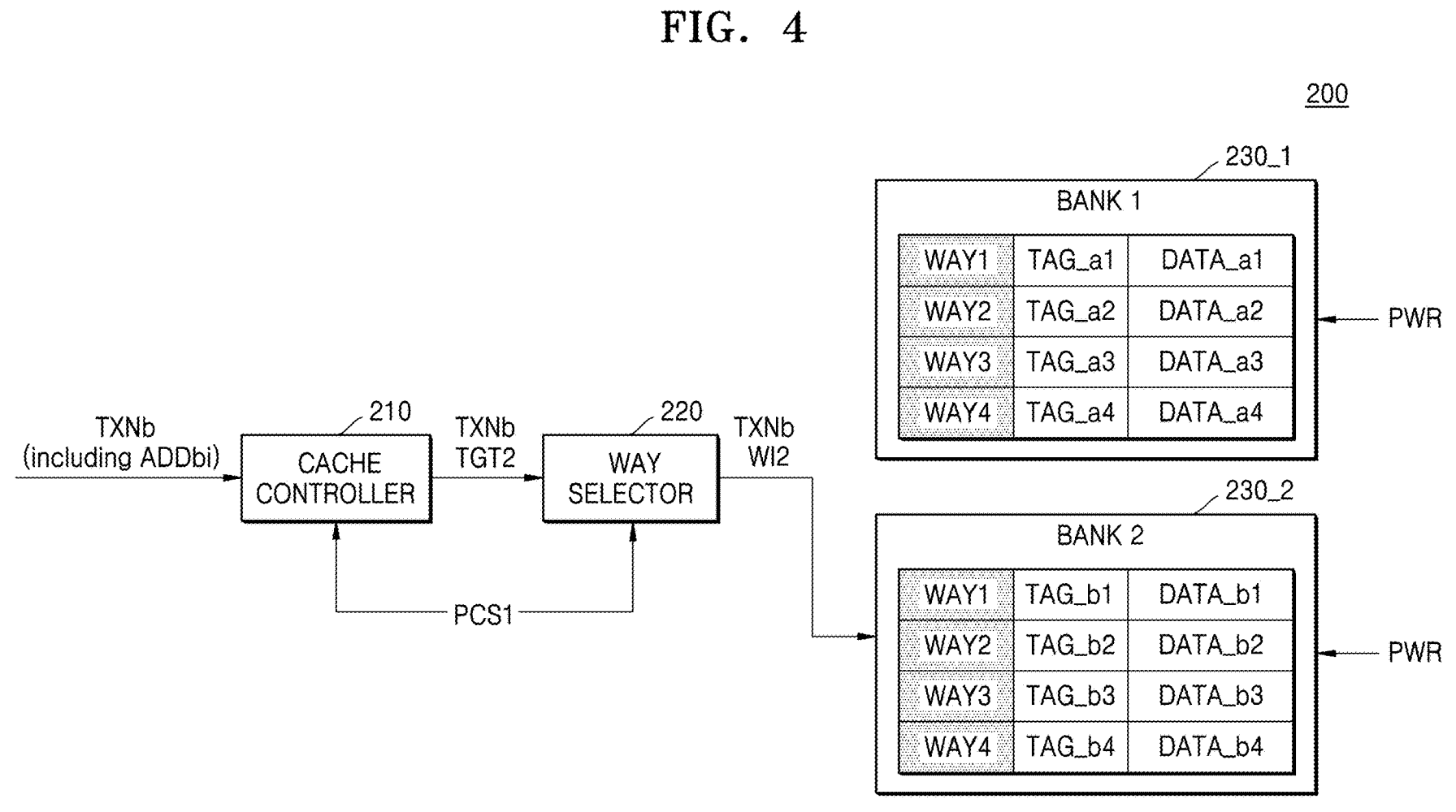

PWR
PWR

230_1
BANK 1

| WAY1 | TAG_a1 | DATA_a1 |
| --- | --- | --- |
| WAY2 | TAG_a2 | DATA_a2 |
| WAY3 | TAG_a3 | DATA_a3 |
| WAY4 | TAG_a4 | DATA_a4 |

230_2
BANK 2

| WAY1 | TAG_b1 | DATA_b1 |
| --- | --- | --- |
| WAY2 | TAG_b2 | DATA_b2 |
| WAY3 | TAG_b3 | DATA_b3 |
| WAY4 | TAG_b4 | DATA_b4 |

TXNb
(including ADDbi)

210
CACHE CONTROLLER

TXNb
TGT2

PCS1

220
WAY SELECTOR

TXNb
WI2

BANK 1

| WAY1 | TAG_a1 | DATA_a1 |
|---|---|---|
| WAY2 | TAG_a2 | DATA_a2 |
| WAY3 | TAG_a3 | DATA_a3 |
| WAY4 | TAG_a4 | DATA_a4 |

PWR

230_2

BANK 2

| WAY1 | TAG_b1 | DATA_b1 |
|---|---|---|
| WAY2 | TAG_b2 | DATA_b2 |
| WAY3 | TAG_b3 | DATA_b3 |
| WAY4 | TAG_b4 | DATA_b4 |

PWR

220 WAY SELECTOR

TXNb WI2

210 CACHE CONTROLLER

TXNb (including ADDbi)

TXNb TGT2

PCS1

Figure 8:
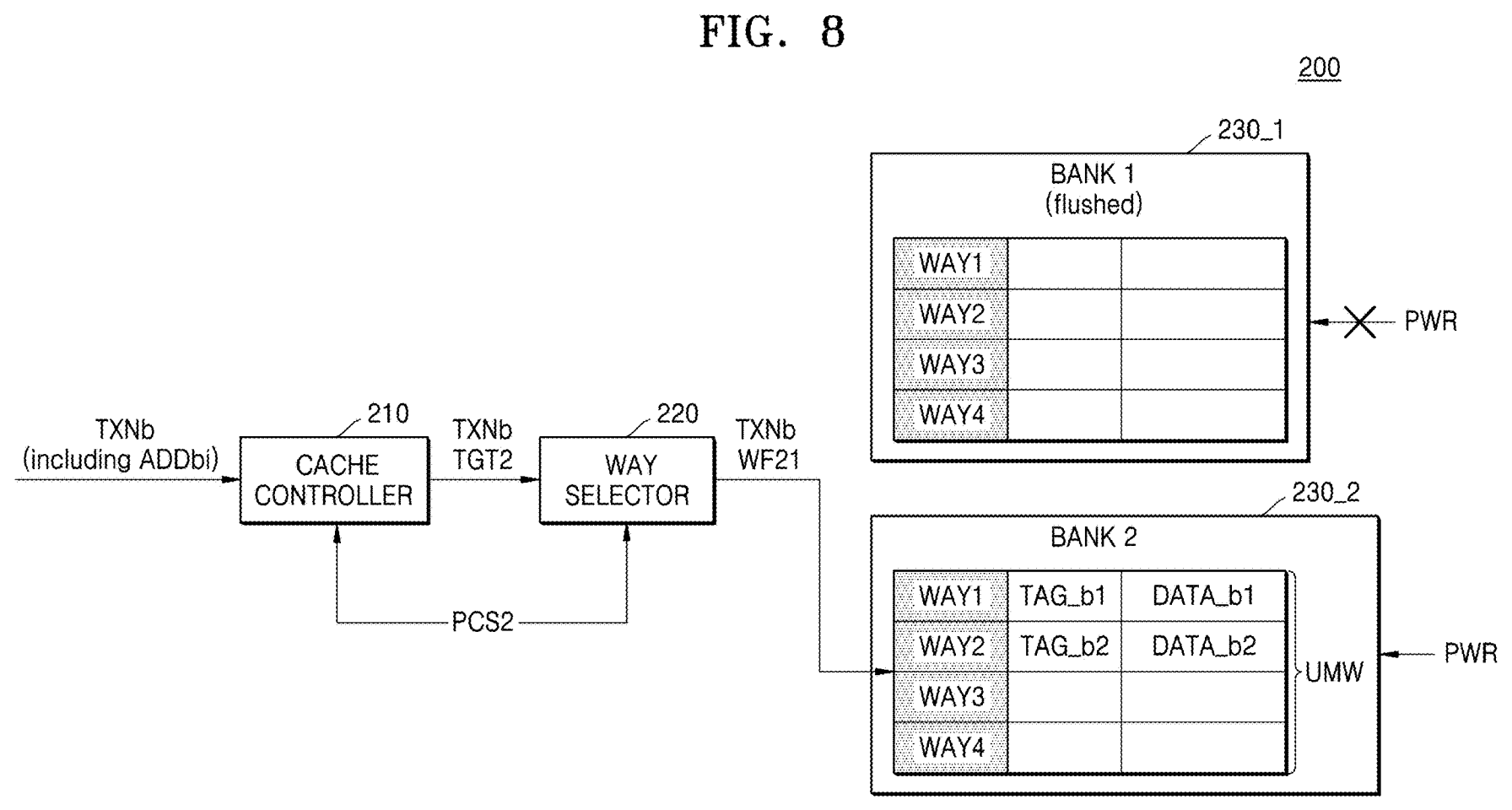

TXNb (including ADDbi)

210 CACHE CONTROLLER

TXNb TGT2

PCS2

220 WAY SELECTOR

TXNb WF21

230_1 BANK 1 (flushed)

WAY1 WAY2 WAY3 WAY4

PWR

230_2 BANK 2

UMW

WAY1 TAG_b1 DATA_b1

WAY2 TAG_b2 DATA_b2

WAY3

WAY4

PWR

Figure 10:
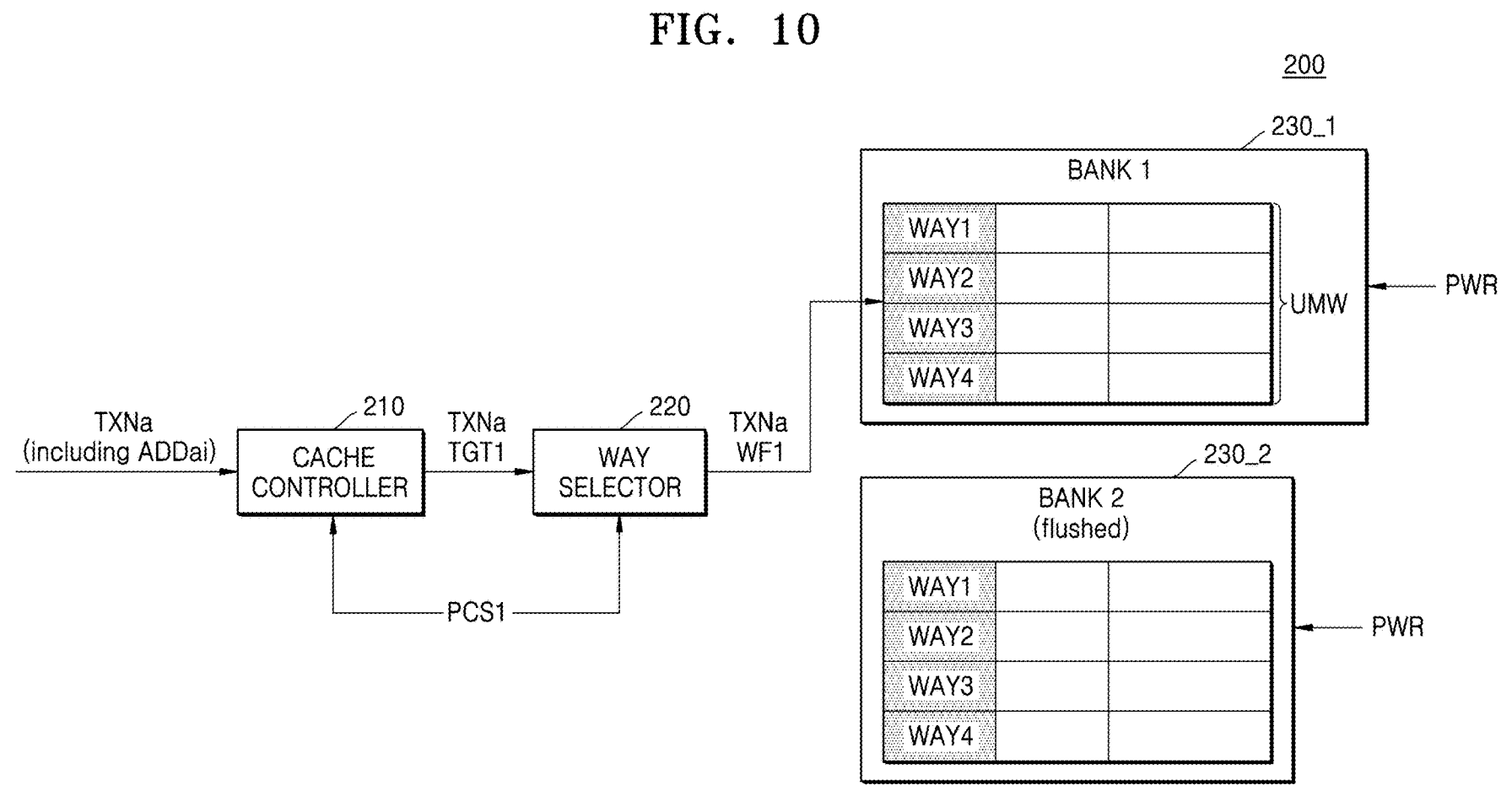

BANK 1

PWR

UMW

WAY1
WAY2
WAY3
WAY4

230_2

BANK 2
(flushed)

PWR

WAY1
WAY2
WAY3
WAY4

TXNa
(including ADDai)

210

CACHE
CONTROLLER

TXNa
TGT1

220

WAY
SELECTOR

TXNa
WF1

PCS1

400
420
421
Transaction with A
440
Arbitrator
441
Transaction with A to way 0/1/2/3
442
A to way 2/3
450
BANK 0
Way0 Tag A0 Data A0
Way1 Tag A1 Data A1
Way2 Tag A2 Data A2
Way3 Tag A3 Data A3
411
Requested Address
Arbitrator
430
HASH FUNCTION
460
BANK 1
Way0 Tag B0 Data B0
Way1 Tag B1 Data B1
Way2 Tag B2 Data B2
Way3 Tag B3 Data B3
422
Transaction with B
410
HASH FUNCTION
412
BANK 1 power off

Figure 15:
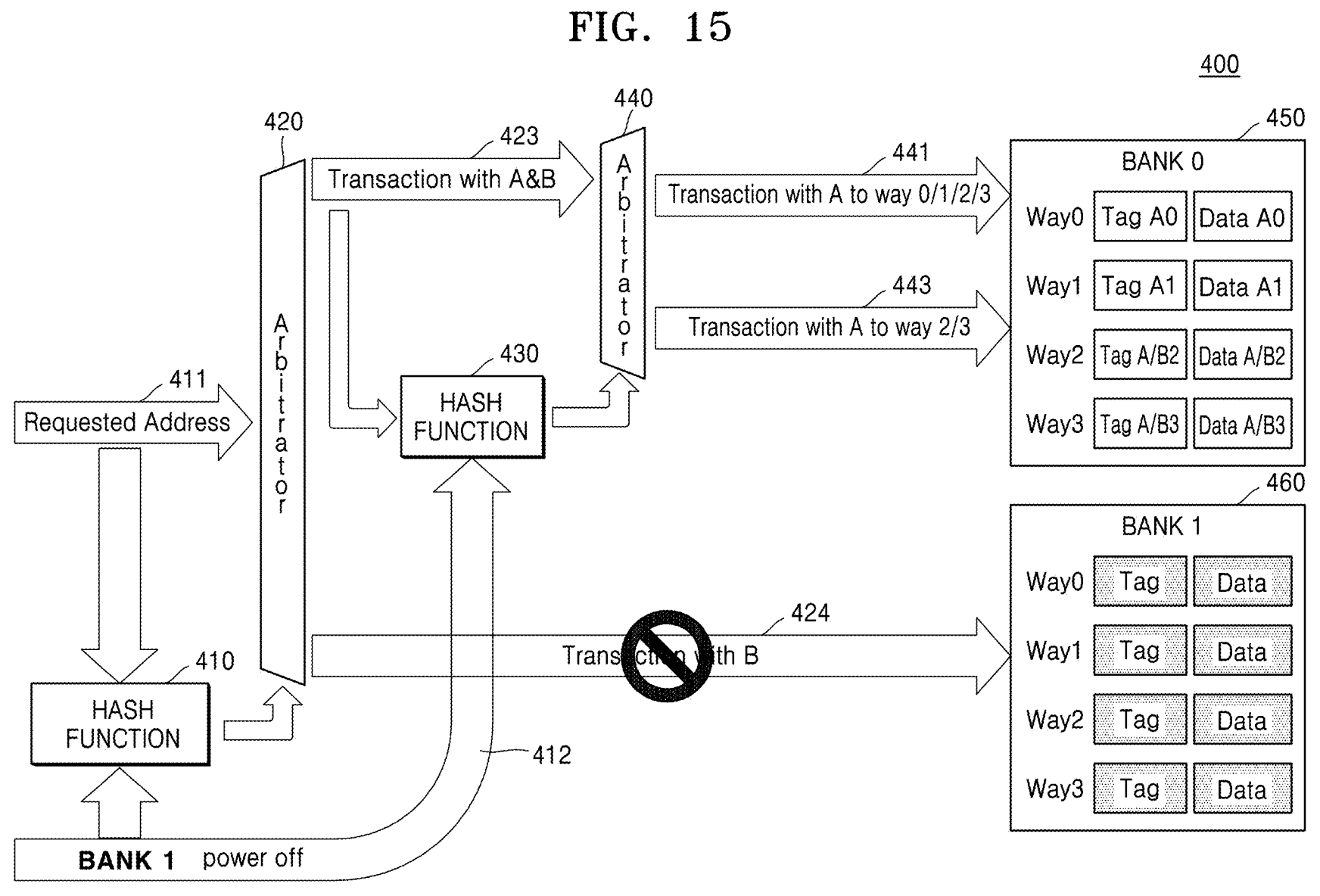

450
BANK 0
Way0 Tag A0 Data A0
Way1 Tag A1 Data A1
Way2 Tag A/B2 Data A/B2
Way3 Tag A/B3 Data A/B3

460
BANK 1
Way0 Tag Data
Way1 Tag Data
Way2 Tag Data
Way3 Tag Data

441 Transaction with A to way 0/1/2/3
443 Transaction with A to way 2/3
424 Transaction with B
440 Arbitrator
423 Transaction with A&B
430 HASH FUNCTION
412
420 Arbitrator
411 Requested Address
410 HASH FUNCTION
BANK 1 power off

Figure 16:
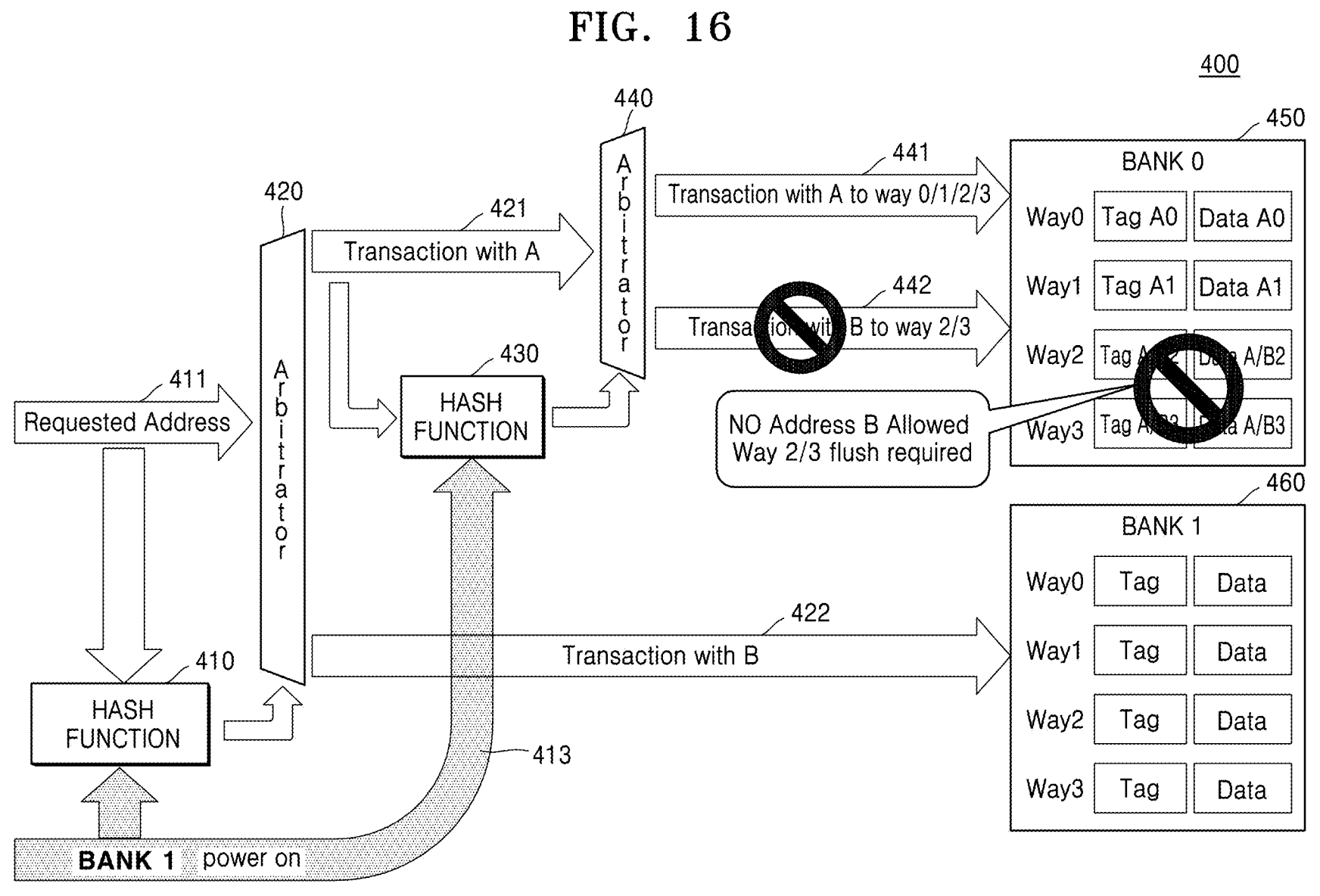

411 Requested Address

410 HASH FUNCTION

BANK 1 power on

413

420 Arbitrator

421 Transaction with A

422 Transaction with B

430 HASH FUNCTION

440 Arbitrator

441 Transaction with A to way 0/1/2/3

442 Transaction with B to way 2/3

NO Address B Allowed
Way 2/3 flush required

450 BANK 0

Way0 Tag A0 Data A0

Way1 Tag A1 Data A1

Way2 Tag A/B2 Data A/B2

Way3 Tag A/B3 Data A/B3

460 BANK 1

Way0 Tag Data

Way1 Tag Data

Way2 Tag Data

Way3 Tag Data

FIG. 17

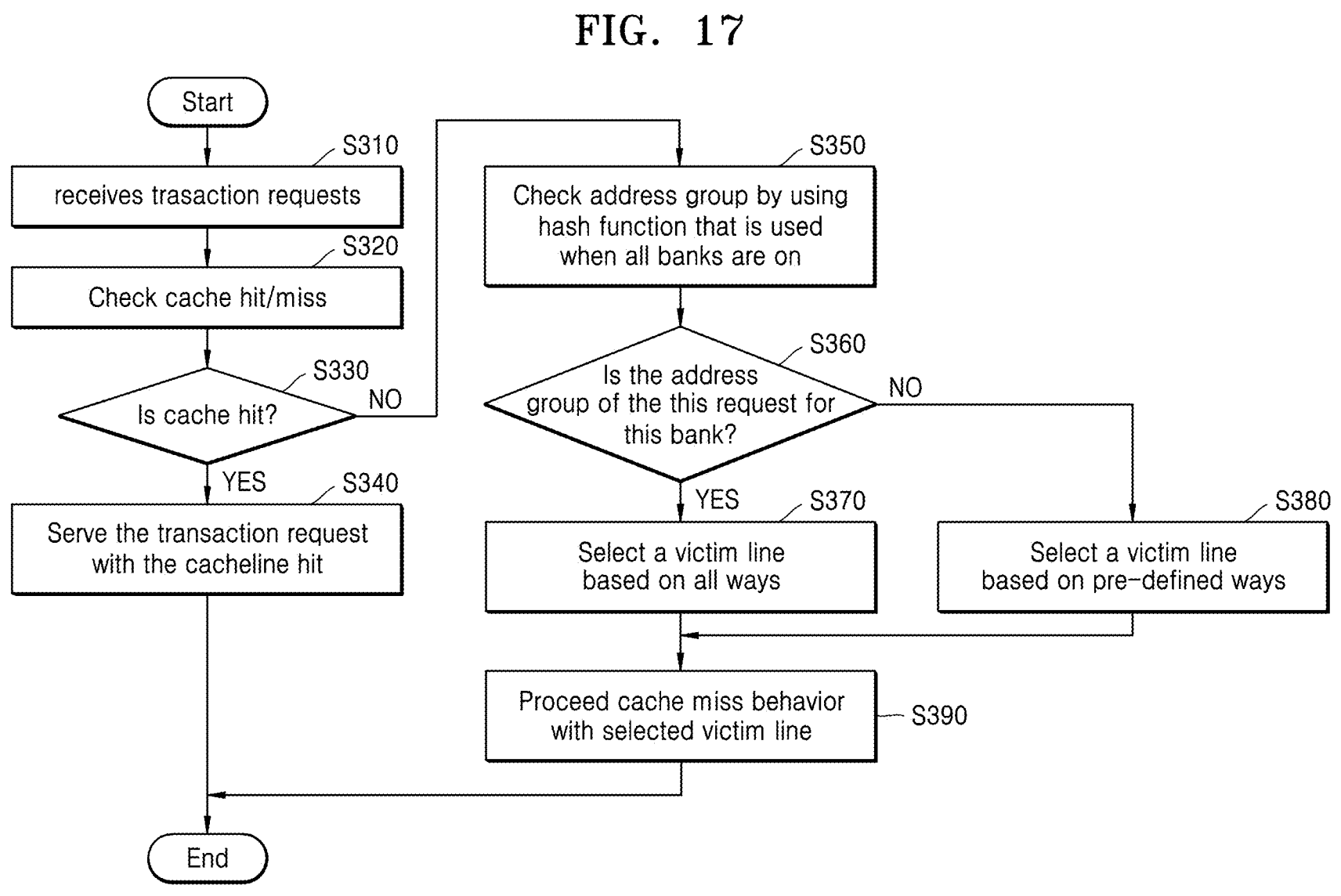

Start

S310 receives trasaction requests

S320 Check cache hit/miss

S330 Is cache hit?

YES

NO

S340 Serve the transaction request with the cacheline hit

S350 Check address group by using hash function that is used when all banks are on S360 Is the address group of the this request for this bank?

YES

NO

S370 Select a victim line based on all ways

S380 Select a victim line based on pre-defined ways

S390 Proceed cache miss behavior with selected victim line

End

ELECTRONIC DEVICE, MEMORY DEVICE, AND OPERATING METHOD OF MEMORY DEVICE

CROSS-REFERENCE TO RELATED APPLICATIONS

This application claims priority under 35 U.S.C. § 119 to Korean Patent Applications Nos. 10-2023-0115275 and 10-2023-0172727, respectively filed on Aug. 31, 2023, and Dec. 1, 2023, in the Korean Intellectual Property Office, the disclosures of which are incorporated by reference herein in their entirety.

BACKGROUND

A semiconductor memory is widely used to store data in various electronic devices, such as computers and wireless communication devices. In static random access memory (SRAM), which is a type of semiconductor memory, single-port SRAM and dual-port SRAM, which may perform read and write operations at higher speed than the single-port SRAM, have been developed. In typical single-port SRAM, one unit memory cell may include six transistors and sequentially perform read and write operations, while dual-port SRAM may be configured such that two active transistors are added to typical single-port SRAM to perform read and write operations in a dual mode, and be used for integrated circuits (ICs) that require ultrahigh speed.

SUMMARY

The present disclosure relates to a memory device to improve a flush operation time, a response time, processing speed, and power consumption, an electronic device including the memory device, an electronic device including the memory device, and an operating method of the memory device.

In some implementations, a memory device includes a first bank including a first way group configured to receive power and store a first cache line corresponding to a first address, a second bank including a second way group configured to receive power and store a second cache line corresponding to a second address, a cache controller configured to output a second target indicating the second bank, based on a power control signal indicating to stop supplying the power to the first bank and the first address, and a way selector configured to transmit the first address to the second bank, based on the first address, the power control signal, and the second target.

In some implementations, a memory device includes a first bank including a first way group, a second bank including a second way group, the second way group being configured to receive power and store a first cache line corresponding to a first address and a second cache line corresponding to a second address, a cache controller configured to output a first target indicating the first bank, based on a power control signal indicating to supply the power to the first bank and the first address, and a way selector configured to transmit the first address to the first bank, based on the first address, the power control signal, and the first target.

In some implementations, an operating method of a memory device includes receiving a power control signal indicating whether to supply power to a first bank group including at least one of a plurality of banks capable of operating independently, selecting the first bank group or a second bank group, based on a transaction including an address and the power control signal, the second bank group including at least one bank configured to receive power and being other than the first bank group among the plurality of banks, and transmitting the transaction to the selected bank group, based on the transaction and the power control signal.

In some implementations, an electronic device includes a processor configured to output an operation request and a transaction including an address, a power manager configured to generate power and output a power control signal indicating whether to supply the power to a first bank including at least one bank, and a memory including a plurality of banks, a cache controller, and a way selector, the plurality of banks capable of operating independently by receiving power, the cache controller being configured to select the first bank group or a second bank group, based on the transaction and the power control signal, the second bank group including at least one bank configured to receive power and being other than the first bank group among the plurality of banks, and the way selector being configured to transmit the transaction to the selected bank group, based on the transaction and the power control signal.

BRIEF DESCRIPTION OF THE DRAWINGS

Implementations will be more clearly understood from the following detailed description taken in conjunction with the accompanying drawings.

FIG. 1 is a block diagram of an example of an electronic device.

FIGS. 2A, 2B, and 2C illustrate an example of a selection of a hash function in response to a power control signal.

FIGS. 3, 4, and 5 are diagrams illustrating operations of an example of a memory.

FIG. 8 illustrates an example of a transmission of a second transaction to a bank when the operation shown in FIG. 6 is performed.

FIG. 10 illustrates an example implementation in which a transaction is transmitted to a bank when the operation shown in FIG. 9 is performed.

FIGS. 14, 15, and 16 are diagrams illustrating operations of an example of an electronic device.

FIG. 17 is a flowchart illustrating an example of a cache hit operation and a cache miss operation.

DETAILED DESCRIPTION

Figure 2A:
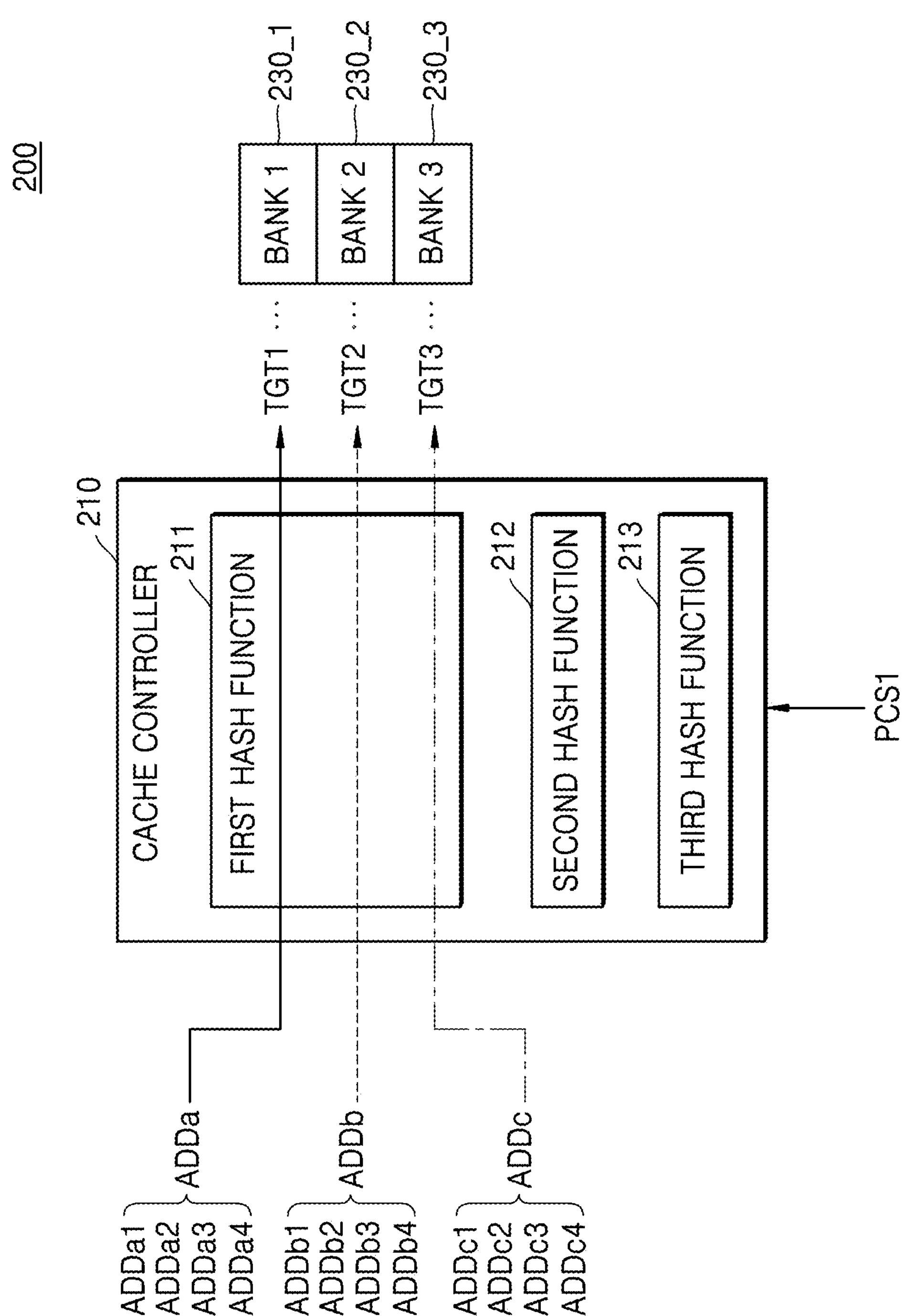

Hereinafter, implementations will be described in detail with reference to the accompanying drawings.

FIG. 1 is a block diagram of an example of an electronic device 10.

Referring to FIG. 1, the electronic device 10 may include a mobile device, such as a smartphone and a wearable device. In this case, the electronic device 10 may be implemented as an application processor (AP) or a system-on-chip (SoC). However, the present disclosure is not limited thereto, and the electronic device 10 may be included in a computing device, such as a personal computer (PC), a tablet PC, and a server.

The electronic device 10 may include a processor 110, a memory device 120, and a power manager 130.

The processor 110 may be a data processing device, such as a central processing unit (CPU), a neural processing unit (NPU), a graphics processing unit (GPU), and an AP. The processor 110 may perform an operating system (OS) and/or various application programs. The processor 110 may transmit, to the memory device 120, a transaction requesting the memory device 120 to perform a specific operation. Also, the processor 110 may receive a response to the transaction from the memory device 120. For example, the processor 110 may transmit a transaction including a read request and an address to the memory device 120, and the memory device 120 may read data stored in a memory area corresponding to the address. However, the present disclosure is not limited thereto.

The memory device 120 may perform operations by receiving power from the power manager 130. The memory device 120 may be referred to as a memory. The memory device 120 may include a cache controller 121, a way selector 122, and a plurality of banks 123_1, 123_2, . . . , and **123_*n*. The cache controller 121 may receive the transactions provided from the processor 110. The cache controller 121 may transmit the transaction to a bank corresponding to the address included in the transaction to access the bank. In some implementations, the cache controller 121 may select a first bank group or a second bank group from among the plurality of banks 123_1, 123_2, . . . , and 123_*n*, based on the transaction and a power control signal. The first bank group may include at least one bank of the plurality of banks 123_1, 123_2, . . . , and 123_*n*. The second bank group may include the remaining banks other than the first bank group, among the plurality of banks 123_1, 123_2, . . . , and 123_*n*. In some implementations, the first bank group may include at least one bank to which the supplying of power may be interrupted while the electronic device 10 is turned on, and the second bank group may include at least one bank designed to always receive power while the electronic device 10 is turned on. The power control signal may be generated by the power manager 130. The way selector 122 may transmit the transaction to a selected bank group. In some implementations, the way selector 122 may transmit the transaction to at least one of a plurality of ways included in at least one selected bank, based on the transaction transmitted by the cache controller 121 and the power control signal. The number of banks 123_1, 123_2, . . . , and 123_*n* may be n. n may be an integer of 2 or more. Each of the plurality of banks 123_1, 123_2, . . . , and 123_*n* may independently operate by receiving power generated by the power manager 130**. A bank may also be referred to as a slice.

In some implementations, the memory device 120 may be implemented as static random access memory (SRAM). The SRAM may be used as a cache in a computing device. To improve throughput, which represents a data processing amount per unit time of cache, an independently operable bank structure may be applied to SRAM. The bank structure may be a structure that includes a cache partitioned into a plurality of partitions that are simultaneously accessible. When SRAM of the bank structure requires relatively low performance, some banks may be powered off to save power. In contrast, when the SRAM of the bank structure requires high performance, power may be supplied to a powered-off bank. When a power mode is transitioned, cache lines mapped to a powered-off bank may need to be redirected to a powered-on bank, and a cache flush may be accompanied to ensure a normal operation. When the number of banks to be operated is reduced, all cache lines of a bank to be powered off may need to be flushed. When the number of banks to be operated increases, from among cache lines of a powered-on bank, cache lines to be mapped to a bank that is newly powered on may need to be flushed.

A power manager 130 may generate power. The power generated by the power manager 130 may be supplied to the processor 110 and/or the memory device 120. In some implementations, the power generated by the power manager 130 may be supplied to at least one of the plurality of banks 123_1, 123_2, . . . , and **123_*n*. The power manager 130 may output a power control signal indicating whether to supply power to the first bank group of the plurality of banks 123_1, 123_2, . . . , and 123_*n*. In some implementations, the power manager 130 may output a power control signal indicating whether to supply power to at least one bank (e.g., power off or power on). In some implementations, the power manager 130 may output a power control signal indicating a first mode in which power is supplied only to a specific bank (e.g., a first bank 123_10 of the plurality of banks 123_1, 123_2, . . . , and 123_*n*), a second mode in which power is supplied to a predetermined number (e.g., n/2) of banks of the plurality of banks 123_1, 123_2, . . . , and 123_*n*, or a third mode in which power is supplied to the plurality of banks 123_1, 123_2, . . . , and 123_*n*. According to some implementations, the power manager 130** may be implemented as a power management unit (PMU).

The memory device 120 of the present disclosure may reduce power consumption and performance degradation in a system that controls power-performance balance through dynamic cache size adaptation. The memory device 120 of the present disclosure may be implemented as an L1 cache or an L2 cache of a CPU or an L3 cache of a CPU cluster. Alternatively, the memory device 120 of the present disclosure may be used for a cache embedded in a GPU or an NPU and a last level cache (LLC) included in a bus interconnect.

The above-described implementation may have the effect of improving the speed of changing a mode to power on or off a bank, the effect of improving power consumption, and the effect of improving a response time.

Figure 2B:
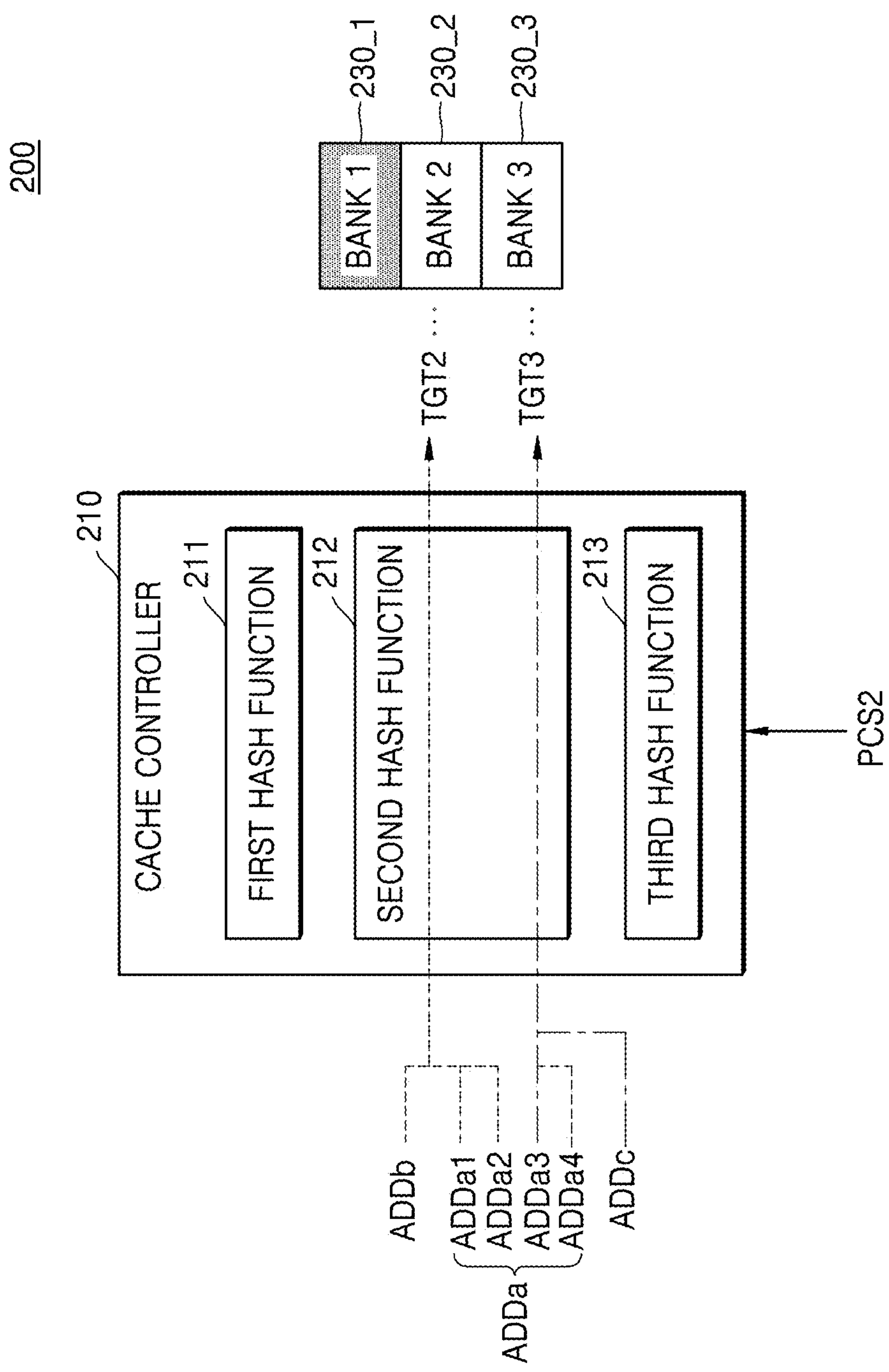

FIGS. 2A, 2B, and 2C illustrate an example of a selection of a hash function in response to a power control signal.

Referring to FIGS. 2A, 2B, and 2C, a memory 200 may correspond to the memory device 120 of FIG. 1. The cache controller 210 included in the memory 200 may select any one hash function in response to a power control signal, out of a plurality of hash functions. The cache controller 210 may input an address to the selected hash function and generate and output a target as an output of the selected hash function. In some implementations, an address included in each address group may include information required to check whether a block in a cache was requested by a processor 110, and include a tag field including upper bits of the address and an index field including an index value indicating a specific way, from among a plurality of ways. The address may further include an offset field including an offset value. In this case, the tag field and the index field may be input into the hash function. The memory 200 may include a plurality of banks. For example, the memory 200 may include first to third banks 230_1, 230_2, and 230_3, and the cache controller 210 may include first to third hash functions 211, 212, and 213. However, the present disclosure is not limited thereto.

In some implementations, the power control signal may indicate to supply power to at least one of the plurality of bank. Referring to FIGS. 2A, 2B, and 2C, in an example, the power control signal may indicate to supply power to only one of the first to third banks 230_1, 230_2, and 230_3. In another example, the power control signal may indicate to supply power to only two of the first to third banks 230_1, 230_2, and 230_3. In still another example, the power control signal may indicate to supply power to all of the first to third banks 230_1, 230_2, and 230_3. However, the present disclosure is not limited thereto. In some implementations, the power control signal may indicate to stop supplying power to one or two of three banks. Hereinafter, the power control signal is assumed to indicate to supply power to at least one bank. In some implementations, a first bank group according to the present disclosure may include first and second banks 230_1 and 230_2, and a second bank group according to the present disclosure may include a third bank 230_3.

Referring to FIG. 2A, a first power control signal PCS1 may be input into the memory 200. The first power control signal PCS1 may indicate to supply power to all of the first to third banks 230_1, 230_2, and 230_3. The cache controller 210 may select a first hash function 211 in response to the first power control signal PCS1. The cache controller 210 may input a first address group ADDa to the first hash function 211 and output a first target TGT1 indicating the first bank 230_1 (or representing the first bank 230_1). The first address group ADDa may include a plurality of first addresses (e.g., ADDa1, ADDa2, ADDa3, and ADDa4). Each of the first addresses ADDa1, ADDa2, and ADDa3 may correspond to at least one way included in the first bank 230_1. The number of first addresses ADDa1, ADDa2, ADDa3, and ADDa4 is illustrated as four as only an example. The cache controller 210 may input a second address group ADDb to the first hash function 211 and output a second target TGT2 indicating the second bank 230_2. The second address group ADDb may include a plurality of second addresses (e.g., ADDb1, ADDb2, ADDb3, and ADDb4). Each of the second addresses ADDb1, ADDb2, ADDb3, and ADDb4 may correspond to at least one way included in the second bank 230_2. The cache controller 210 may input a third address group ADD to the first hash function 211 and output a third target TGT3 indicating the third bank 230_3. The third address group ADDc may include a plurality of third addresses (e.g., ADDc1, ADDc2, ADDc3, and ADDc4). Each of the third addresses ADDc1, ADDc2, ADDc3, and ADDc4 may correspond to at least one way included in the third bank 230_3. When power is supplied to all of banks (e.g., the first to third banks 230_1, 230_2, and 230_3) as described above, a specific address group may be mapped to only a specific bank.

Referring to FIG. 2B, a second power control signal PCS2 may be input into the memory 200. The second power control signal PCS2 may indicate to supply power to two banks (e.g., only the second and third banks 230_2 and 230_3), from among the first to third banks 230_1, 230_2, and 230_3. Because the supplying of power to the first bank 230_1 is interrupted, a first address group ADDa may need to be remapped to another bank (i.e., the second bank 230_2 or the third bank 230_3) other than the first bank 230_1. For example, from among the plurality of first addresses (e.g., ADDa1, ADDa2, ADDa3, and ADDa4), some first addresses (e.g., ADDa1 and ADDa2) may be mapped to the second bank 230_2, and some other first addresses (e.g., ADDa3 and ADDa4) may be mapped to the third bank 230_3. An implementation of mapping some addresses is not limited to that shown in FIG. 2B and may be designed in various ways. The cache controller 210 may select a second hash function 212 in response to the second power control signal PCS2. When the first addresses ADDa1 and ADDa2 are input into the cache controller 210, the cache controller 210 may output a second target TGT2 by using the second hash function 212. When the some other first addresses (e.g., ADDa3 and ADDa4) are input into the cache controller 210, the cache controller 210 may output a third target TGT3 by using the second hash function 212. A case in which the second address group ADDb and/or the third address group ADDc are input into the cache controller 210 is the same as described above with reference to FIG. 2A.

Referring to FIG. 2C, a third power control signal PCS3 may be input into the memory 200. The third power control signal PCS3 may indicate to supply power to any one bank (e.g., only the third bank 230_3), from among the first to third banks 230_1, 230_2, and 230_3. Because the supplying of power to the first bank 230_1 and the second bank 230_2 is interrupted, the first address group ADDa and the second address group ADDb may need to be remapped to the third bank 230_3. To this end, the cache controller 210 may select the third hash function 213 in response to the third power control signal PCS3. When the first address group ADDa, the second address group ADDb, or the third address group ADDc is input into the cache controller 210, the cache controller 210 may output the third target TGT3 by using the third hash function 213. When the supplying of power to at least one bank is interrupted as described above, a specific address group may be remapped to a bank different from the previously mapped bank.

Although not shown, the cache controller 210 may further include an arbitrator configured to transmit an address or a transaction including the address to a bank according to a target.

FIGS. 3, 4, and 5 are diagrams illustrating operations of an example of a memory. Specifically, FIG. 3 illustrates an implementation in which a first transaction TXNa including an arbitrary first address ADDai is transmitted to a first bank 230_1, and FIGS. 4 and 5 illustrate implementations in which a second transaction TXNb including an arbitrary second address ADDbi is transmitted to a second bank 230_2.

Referring to FIGS. 3, 4, and 5, a memory 200 may include a cache controller 210, a way selector 220, the first bank 230_1, and the second bank 230_2. Although the memory 200 is illustrated as including two banks in FIGS. 3, 4, and 5, the illustration is provided merely to exemplarily describe the implementations. In some implementations, the first bank 230_1 may be included in a first bank group as a bank to which the supplying of power may be interrupted, and the second bank 230_2 may be included in a second bank group as at least one bank designed to always receive power while the memory 200 is turned on. Each of the first bank 230_1 and the second bank 230_2 may independently operate by receiving power PWR. Each bank may include a plurality of ways. For example, each of the first bank 230_1 and the second bank 230_2 may include first to fourth ways WAY1, WAY2, WAY3, and WAY4. Each of the first bank 230_1 and the second bank 230_2 is illustrated as including four ways in FIGS. 3, 4, and 5, without being limited thereto. Each of the first to fourth ways WAY1, WAY2, WAY3, and WAY4 may include at least one cache line. Tags and data may be stored in each cache line. For example, tags TAG_a1, TAG_a2, TAG_a3, and TAG_a4 for a first address group ADDa and data DATA_a1, DATA_a2, DATA_a3, and DATA_a4 may be respectively stored in cache lines of the first to fourth ways WAY1, WAY2, WAY3, and WAY4 included in the first bank 230_1. The first address group ADDa may include, for example, four first addresses ADDa1, ADDa2, ADDa3, and ADDa4. In this case, a tag TAG_a1 may indicate a first address ADDa1, a tag TAG_a2 may indicate a first address ADDa2, a tag TAG_a3 may indicate a first address ADDa3, and a tag TAG_a4 may indicate a first address ADDa4. For example, tags TAG_b1, TAG_b2, TAG_b3, and TAG_b4 for a second address group ADDb and data DATA_b1, DATA_b2, DATA_b3, and DATA_b4 may be respectively stored in the first to fourth ways WAY1, WAY2, WAY3, and WAY4 included in the second bank 230_2. The tags TAG_b1, TAG_b2, TAG_b3, and TAG_b4 may respectively indicate the second addresses ADDb1, ADDb2, ADDb3, ADDb4 included in the second address group ADDb. A first power control signal PCS1 may be input into the cache controller 210 and the way selector 220. The first power control signal PCS1 may indicate to supply power to the first and second banks 230_1 and 230_2. The cache controller 210 may select the first hash function 211.

Referring to FIG. 3, an arbitrary first address ADDai included in the first transaction TXNa may be mapped to the first bank 230_1. That is, the first transaction TXNa may be transmitted to the first bank 230_1. For example, the processor 110 of FIG. 1 located outside the memory 200 may output the first transaction TXNa including the arbitrary first address ADDai to the memory 200. The cache controller 210 may generate a first target TGT1 indicating the first bank 230_1, based on the arbitrary first address ADDai and the first hash function 211. Also, the cache controller 210 may output the first target TGT1 and the first transaction TXNa. In some implementations, the first target TGT1 and the first transaction TXNa may be transmitted to the way selector 220. The way selector 220 may generate first way information WI1, based on the first power control signal PCS1, the first target TGT1, and the arbitrary first address ADDai. Way information may include a way to be mapped, from among the plurality of ways included in the bank. For example, the first way information WI1 may indicate any one of the first to fourth ways WAY1, WAY2, WAY3, and WAY4 included in the first bank 230_1. In some implementations, the first way information WI1 may include a way field. The way field may include information indicating a way to be masked and a way to be unmasked, from among the plurality of ways included in the bank. An unmasked way may be accessed, while a masked way may not be accessed. The way field is described below with reference to FIGS. 8 to 13. The way selector 220 may output the first way information WI1 and the first transaction TXNa to the first bank 230_1. The first bank 230_1 may perform an operation according to a request of the first transaction TXNa in a specific way mapped to (or corresponding to) the arbitrary first address ADDai. For example, when the first transaction TXNa includes a read request and the first address ADDa1, the first bank 230_1 may determine a cache hit or a cache miss, based on the tag TAG_a1 of the cache line stored in the first way WAY1, and read and output data (DATA_a1) when the cache hit occurs.

Referring to FIG. 4, an arbitrary second address ADDbi included in the second transaction TXNb may be mapped to the second bank 230_2. That is, the second transaction TXNb may be transmitted to the second bank 230_2. For example, the cache controller 210 may output a second target TGT2 indicating the second bank 230_2, based on the arbitrary second address ADDbi and the first hash function 211. In some implementations, the second target TGT2 and the second transaction TXNb may be transmitted to the way selector 220. The way selector 220 may generate second way information WI2, based on the first power control signal PCS1, the second target TGT2, and the arbitrary second address ADDbi. For example, the second way information WI2 may indicate any one of the first to fourth ways WAY1, WAY2, WAY3, and WAY4 included in the second bank 230_2. In some implementations, the second way information WI2 may include a way field.

In some implementations, the way selector 220 may be included in each of the first bank 230_1 and the second bank 230_2. However, the present disclosure is not limited thereto. In some implementations, the way selector 220 may be included in only a bank designed to always receive power. Referring to FIG. 5, for example, when the second bank 230_2 is designed to always receive power while the memory 200 is turned on, the way selector 220 may be included in the second bank 230_2. The second transaction TXNb including the arbitrary second address ADDbi may be transmitted to the second bank 230_2. In this case, the way selector 220 may transmit the second transaction TXNb to the second bank 230_2 to access the second bank 230_2, based on the second target TGT2.

Figure 6:
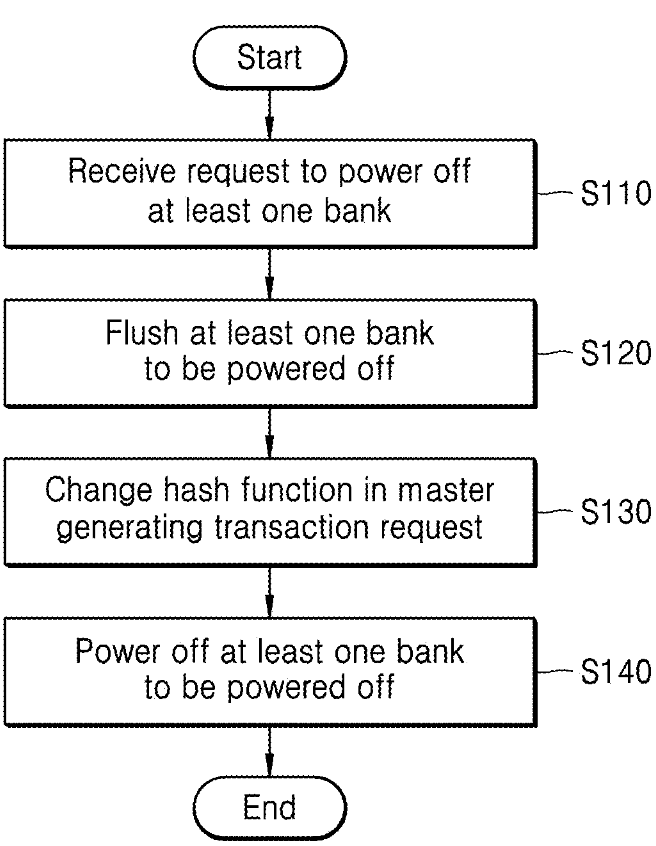
FIG. 6 is a flowchart of an example of an operation of an electronic device.

FIG. 6 is a flowchart of an example of an operation of an electronic device.

Referring to FIGS. 1 and 6, in operation S110, the memory device 120 may receive a request to power off at least one bank. In this case, the request may correspond to the power control signal described above. For example, the power manager 130 may output a power control signal indicating to stop supplying power to a first bank group.

In operation S120, the memory device 120 may flush at least one bank to be powered off. For example, a cache controller 121 may control the first bank group to flush the first bank group in response to the power control signal, and cache lines included in the first bank group may be flushed. A flush operation may include an operation of reading a tag of a cache line stored in a bank and an operation of moving and storing data of the cache line stored in the bank to and in a memory or storage device in a lower layer than the memory device 120, by using information included in the tag. As needed, when the information included in the tag does not need to be updated to the memory or storage device in the lower layer due to a state in which a dirty flag is not set, the operation of storing the data of the cache line in the memory or storage device in the lower layer may be omitted from the flush operation. A memory hierarchy may include a register included in a processor, an L1 cache, an L2 cache, an L3 cache, a main memory, and a secondary storage. For example, when the memory device 120 is the L1 cache, the memory in the lower layer than the memory device 120 may be the L2 cache, the L3 cache, or the main memory, and the storage device in the lower layer than the memory device 120 may be a secondary storage. However, the present disclosure is not limited thereto. The main memory may correspond to, for example, double data rate synchronous dynamic RAM (DDR SDRAM), low power double data rate (LPDDR) SDRAM, graphics double data rate (GDDR) SDRAM, or Rambus dynamic RAM (RDRAM). The secondary storage may correspond to a memory card, a PC card, a compact flash card, a smart media card, a memory stick, a multimedia card, a secure digital (SD) card, a universal flash memory device, a hard disk drive (HDD), or a solid-state disk/drive (SSD).

In operation S130, the memory device 120 may change a hash function in a master configured to generate a transaction request. For example, the master may be the cache controller 121. The cache controller 121 may receive an address, select a hash function according to the request of operation S110, out of a plurality of hash functions for outputting a hash value as a target, and output the hash value of the selected hash function as the target.

In operation S140, the power manager 130 may power off at least one bank to be powered off. For example, the power manager 130 may stop supplying power to the first bank group after the first bank group is flushed.

Figure 7:
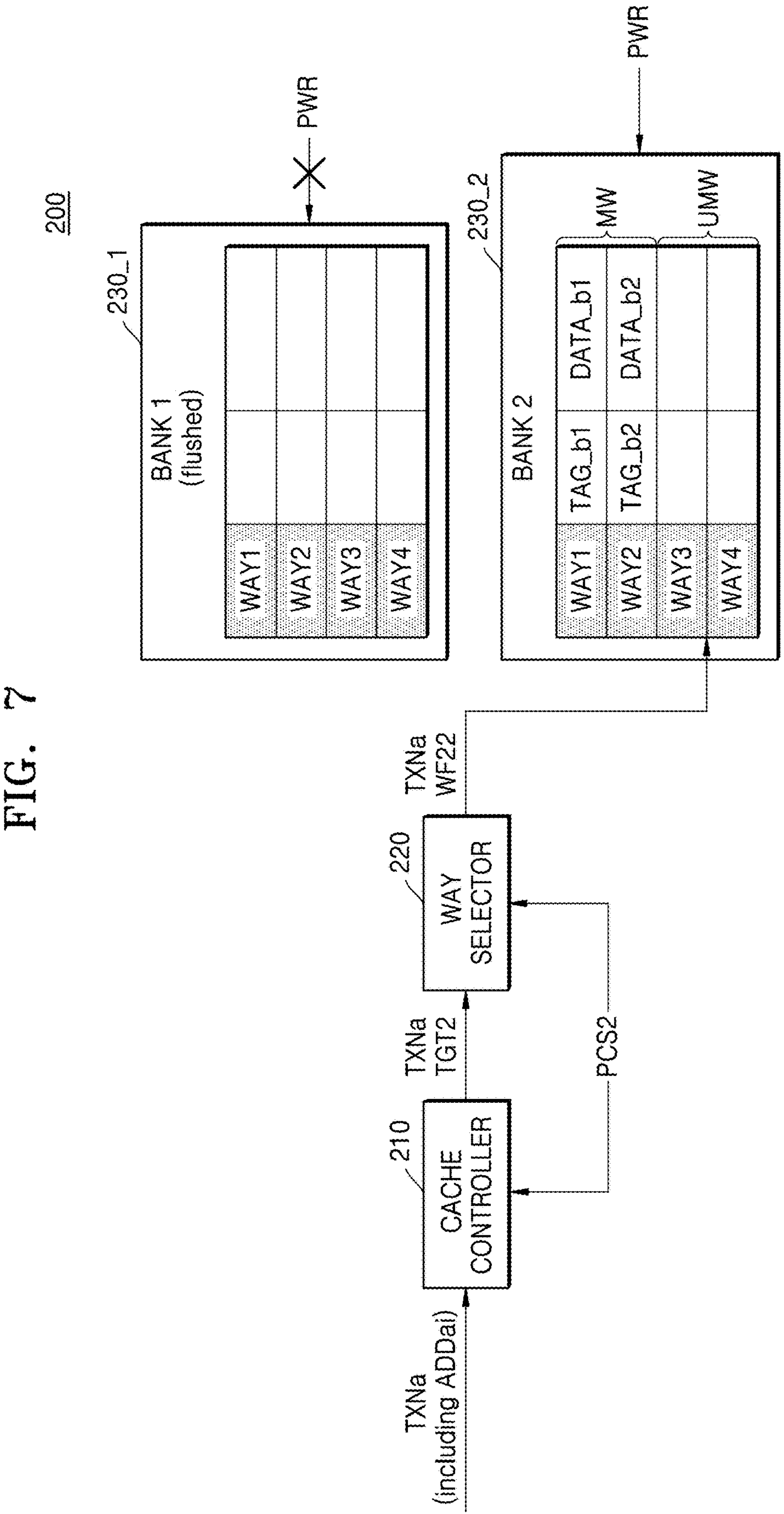
FIG. 7 illustrates an example of a transmission of a first transaction to a bank when the operation shown in FIG. 6 is performed.

FIG. 7 illustrates an example of a transmission of a first transaction to a bank when the operation of FIG. 6 is performed.

Referring to FIGS. 6 and 7, before a second power control signal PCS2 is input into a cache controller 210 and a way selector 220, a first bank 230_1 may include a first way group, may receive power PWR and store a first cache line corresponding to a first address ADDai in the first way group. The first way group may include first to fourth ways WAY1, WAY2, WAY3, and WAY4. The second power control signal PCS2 may be input into the cache controller 210 and the way selector 220. The second power control signal PCS2 may indicate to supply power to only one bank (e.g., the second bank 230_2), from among first and second banks 230_1 and 230_2. The first bank 230_1 may flush the first cache line. In this case, when a tag and data of the first cache line are updated, data of the first cache line may be stored in a memory (or a storage device) in a lower layer. Unlike shown in FIG. 7, when the tag and data of the first cache line are maintained without being updated, the data of the first cache line may not be stored in the memory (or storage device) in the lower layer. The supplying of the power PWR to the first bank 230_1 may be interrupted. The second bank 230_2 may include a second way group configured to receive power PWR and store a second cache line corresponding to a second address ADDbi. The second way group may include first to fourth ways WAY1, WAY2, WAY3, and WAY4. The second cache line corresponding to the second address ADDbi may be, for example, a cache line of the first way WAY1 or a cache line of the second way WAY2 in the second bank 230_2.

When the second power control signal PCS2 is input into a memory 200, the arbitrary first address ADDai may be remapped to the second bank 230_2. For example, the cache controller 210 may receive a first transaction TXNa. The first transaction TXNa may include the arbitrary first address ADDai. The cache controller 210 may select the second hash function 212 in response to the second power control signal PCS2. The cache controller 210 may generate a second target TGT2 indicating the second bank 230_2, based on the second hash function 212 and the first transaction TXNa. The cache controller 210 may output a second target TGT2 and the first transaction TXNa to the way selector 220.

The way selector 220 may transmit the first transaction TXNa to at least one way of the second bank 230_2, based on the first transaction TXNa, the second power control signal PCS2, and the second target TGT2. In some implementations, the way selector 220 may transmit the first transaction TXNa to at least one way of the second bank 230_2, based on the first address ADDai in the first transaction TXNa and the second power control signal PCS2.

In some implementations, the way selector 220 may generate a second way field WF22 by using the arbitrary first address ADDai, the second power control signal PCS2, and the second target TGT2. In this case, in the second way field WF22, masked ways MW may be the first and second ways WAY1 and WAY2, and unmasked ways UMW may be the third and fourth ways WAY3 and WAY4. However, the present disclosure is not limited thereto. The number of unmasked ways UMW may be preset. The first and second ways WAY1 and WAY2 may be included in the first way group, and the third and fourth ways WAY3 and WAY4 may be included in a second way group. The second bank 230_2 may perform an operation corresponding to the first transaction TXNa by accessing the third way WAY3 and/or the fourth way WAY4. For example, the second bank 230_2 may determine a cache hit or a cache miss, based on a tag stored in the third way WAY3 and/or the fourth way WAY4. In this case, when there is no tag stored in the third way WAY3 and/or the fourth way WAY4 or when information about an address different from the first address ADDai is stored in the third way WAY3 and/or the fourth way WAY4, a cache miss may occur.

FIG. 8 illustrates an example of a transmission of a second transaction to a bank when the operation shown in FIG. 6 is performed.

Referring to FIGS. 6 and 8, when a second power control signal PCS2 is input into the memory 200, the first bank 230_1 may flush a first cache line, and the supplying of power PWR to the first bank 230_1 may be interrupted. The arbitrary second address ADDbi may be remapped to the second bank 230_2, and a second transaction TXNb including the arbitrary second address ADDbi may be transmitted to the second bank 230_2. For example, the cache controller 210 may select the second hash function 212 and generate a second target TGT2, based on the second hash function 212 and the arbitrary second address ADDbi. The way selector 220 may generate the second way field WF21, based on the second power control signal PCS2 and the arbitrary second address ADDbi. In the second way field WF21, unmasked ways UMW may be first to fourth ways WAY1, WAY2, WAY3, and WAY4, and there may be no masked way MW. That is, the second bank 230_2 may be accessible to the first to fourth ways WAY1, WAY2, WAY3, and WAY4.

Figure 9:
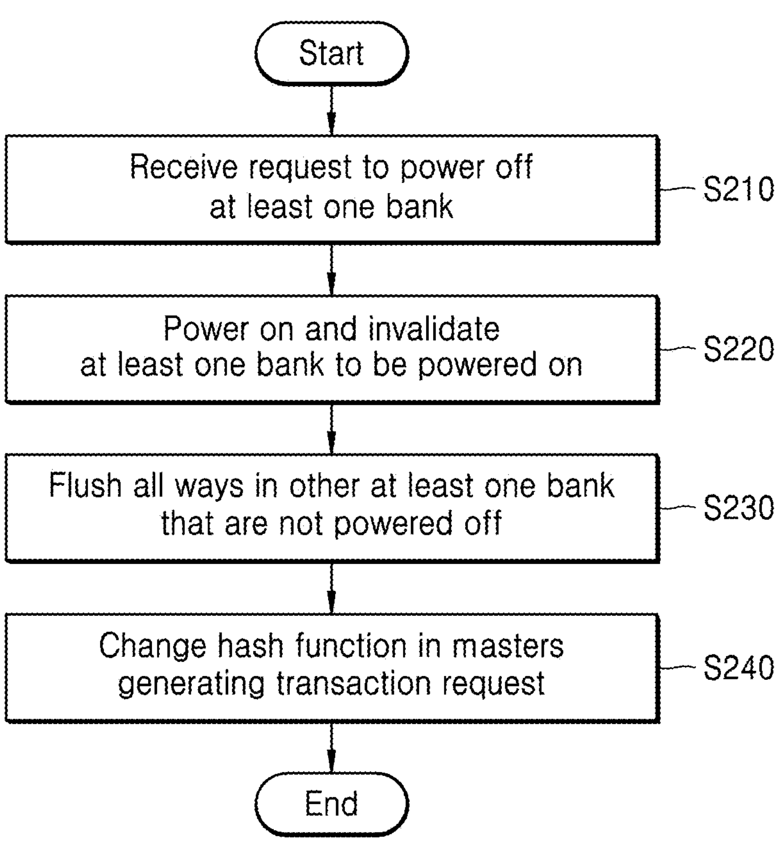
FIG. 9 is a flowchart of an example of an operation of an electronic device.

FIG. 9 is a flowchart of an example of an operation of an electronic device.

Referring to FIGS. 1 and 9, in operation S210, the memory device 120 may receive a request for powering on at least one bank. In this case, the request may correspond to the above-described power control signal. At least one bank may be, for example, a first bank 230_1 and be included in a first bank group. For example, before a power control signal indicating to supply power to the first bank group is generated, a power manager 130 may stop supplying power to the first bank group and supply power to a second bank group. Also, the power manager 130 may output the power control signal to the memory device 120.

In operation S220, the power manager 130 may power on at least one bank, and the memory device 120 may invalidate cache lines stored in at least one bank to be powered on. For example, the power manager 130 may supply power to the first bank group. A cache controller 121 may control the first bank group to invalidate cache lines included in the first bank group in response to the power control signal.

In operation S230, the memory device 120 may flush all ways in at least one other bank that is not powered off. The at least one other bank that is powered off may include, for example, a second bank 230_2 and be included in the second bank group. For example, after the cache lines included in the first bank group are invalidated, the cache controller 121 may control the second bank group (e.g., the second bank 230_2) to flush the first to fourth ways WAY1, WAY2, WAY3, and WAY4 of the second bank 230_2 included in the second bank group. In this case, all cache lines included in the second bank 230_2 may be flushed.

In operation S240, the memory device 120 may change a hash function in a master configured to generate a transaction request. That is, the hash function may be changed such that a first transaction TXNa including an arbitrary first address ADDai is transmitted to the first bank 230_1 and a second transaction TXNb including an arbitrary second address ADDbi is transmitted to the second bank 230_2. For example, the cache controller 210 may select a first hash function 211.

FIG. 10 illustrates an example implementation in which a transaction is transmitted to a bank when the operation shown in FIG. 9 is performed.

Referring to FIGS. 9 and 10, a first power control signal PCS1 may be input into the memory 200. A first bank 230_1 may receive power PWR and invalidate cache lines stored in first to fourth ways WAY1, WAY2, WAY3, and WAY4 included in the first bank 230_1. Moreover, a second bank 230_2 may flush all the first to fourth ways WAY1, WAY2, WAY3, and WAY4.

When the first power control signal PCS1 is input into the memory 200, an arbitrary first address ADDai may be remapped to the first bank 230_1. The implementation shown in FIG. 10 is the same as that described with reference to FIG. 3. In a first way field WF1 output by a way selector 220, unmasked ways UMW may be the first to fourth ways WAY1, WAY2, WAY3, and WAY4. The way selector 220 may transmit the first way field WF1 and a first transaction TXNa to the first bank 230_1.

In an implementation different from that shown in FIG. 10, for example, as described above with reference to FIG. 4, when the way selector 220 is included in the second bank 230_2, a cache controller 210 may transmit the first transaction TXNa to the first bank 230_1 according to a first target TGT1.

Figure 11:
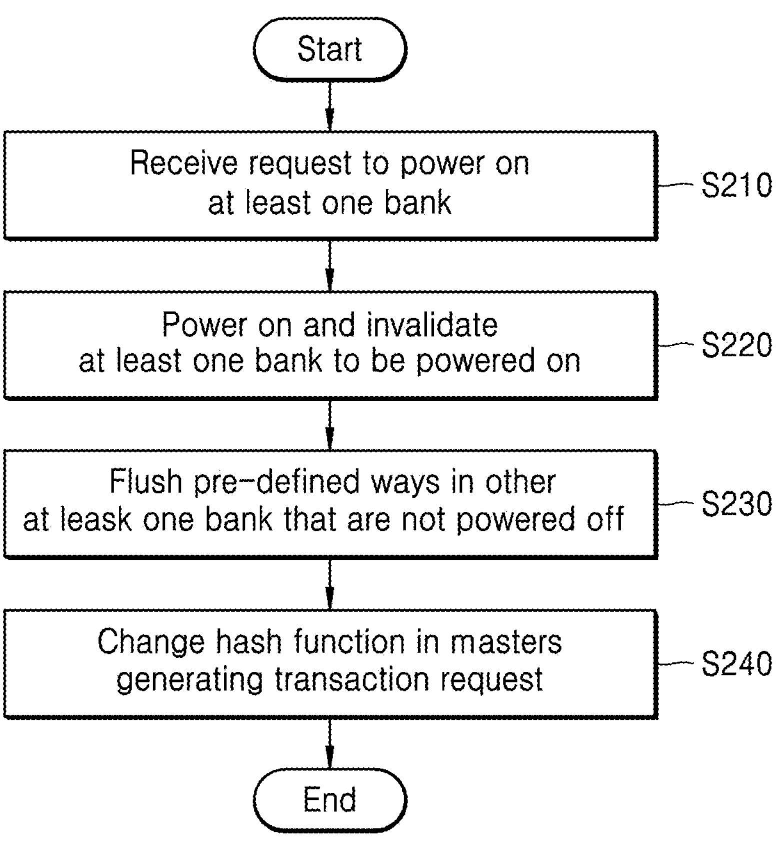
FIG. 11 is a flowchart of an example of an operation of an electronic device.

FIG. 11 is a flowchart of an example of an operation of an electronic device.

Referring to FIGS. 1, 9, and 11, operation S210, operation S220, and operation S240 are the same as those described with reference to FIG. 9.

In operation S230, the memory device 120 may flush predefined ways in at least one other bank that is not powered off. The at least one other bank that is not powered off may be, for example, the second bank 230_2, and the predefined ways, which are unmasked way UMW, may be third and fourth ways WAY3 and WAY4 included in the second way group in the second bank 230_2 described above with reference to FIG. 7. The operation of flushing the predefined ways may be referred to as partial flush.

Figure 12:
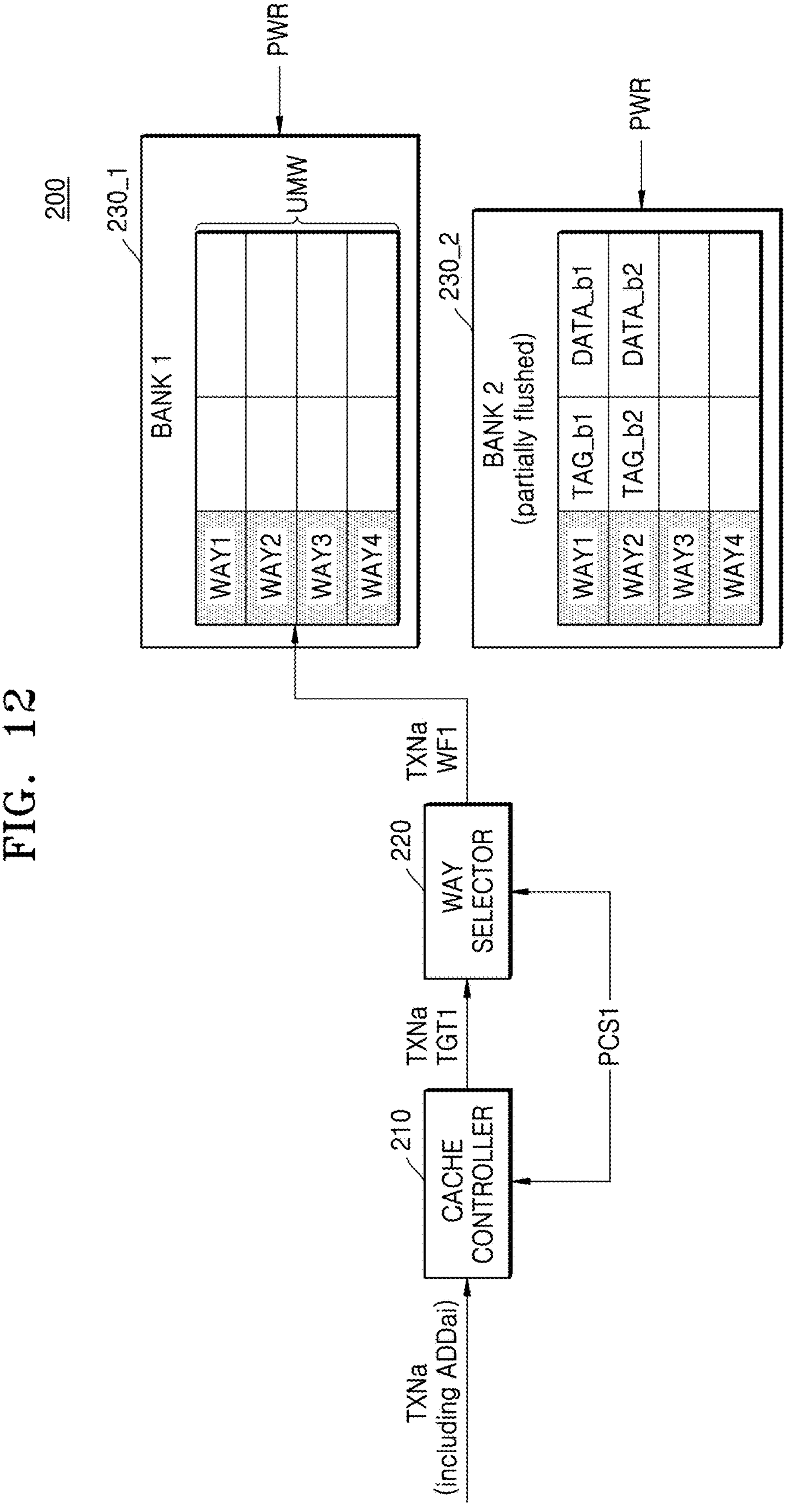
FIG. 12 illustrates an example implementation in which a transaction is transmitted to a bank when the operation shown in FIG. 11 is performed.

FIG. 12 illustrates an example implementation in which a transaction is transmitted to a bank when the operation shown in FIG. 11 is performed.

Referring to FIGS. 7, 11, and 12, when a first power control signal PCS1 is input into a memory 200, a first bank 230_1 may receive power PWR, and the first to fourth ways WAY1, WAY2, WAY3, and WAY4 included in the first bank 230_1 may be invalidated. Moreover, the second bank 230_2 may partially flush predefined ways (e.g., the third and fourth ways WAY3 and WAY4)), from among the first to fourth ways WAY1, WAY2, WAY3, and WAY4. As described above with reference to FIG. 7, this may be because cache lines corresponding to an arbitrary second address ADDbi may be stored in the first and second ways WAY1 and WAY2, and cache lines corresponding to an arbitrary first address ADDai may be stored in the third and fourth ways WAY3 and WAY4. Moreover, a first transaction TXNa including the arbitrary first address ADDai may be transmitted to the first bank 230_1.

Figure 13:
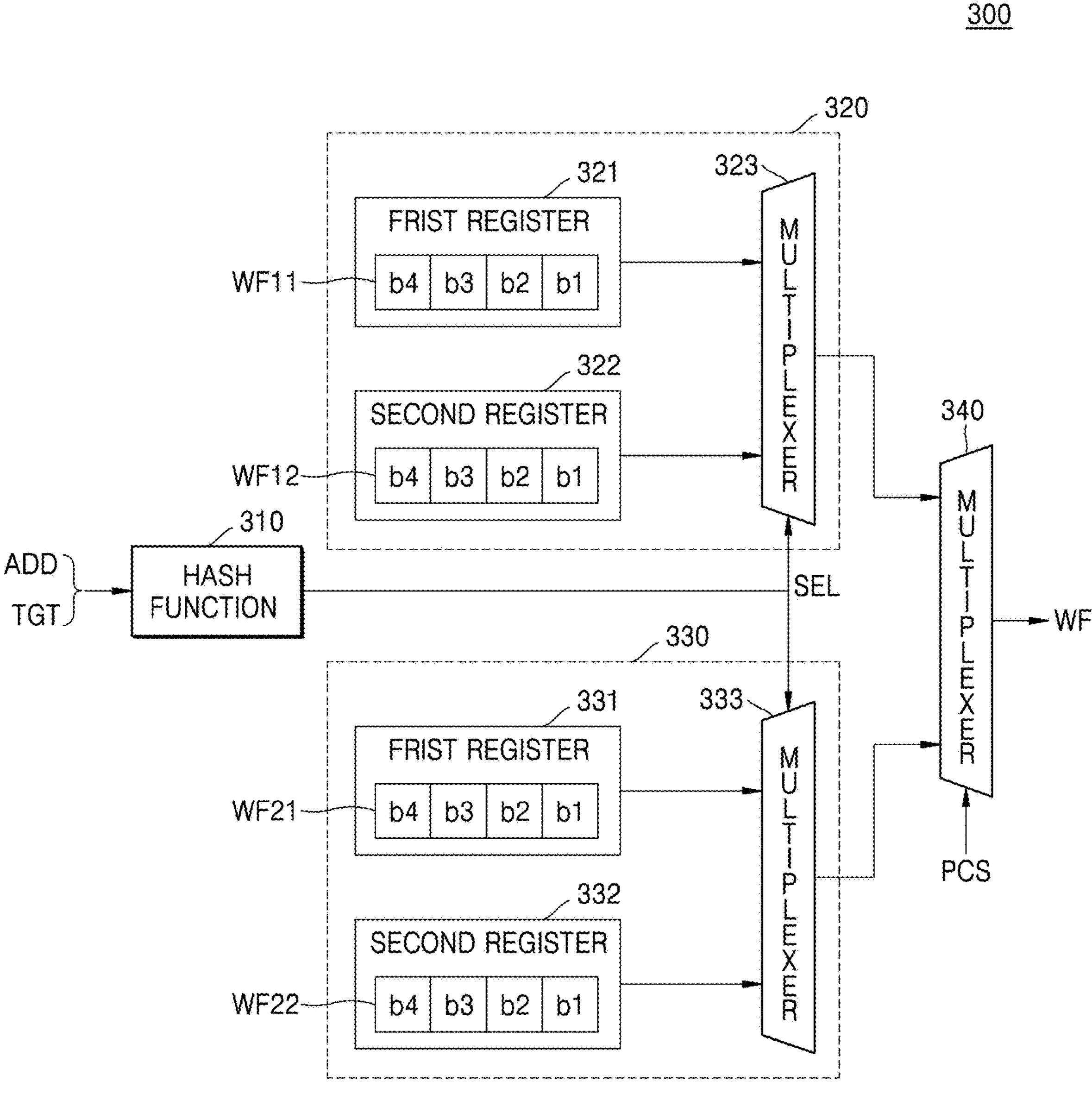
FIG. 13 is a block diagram of an example of a way selector.

FIG. 13 is a block diagram of an example of a way selector 300.

Referring to FIG. 13, the way selector 300 may include a hash function 310, a plurality of way field generators, and a way field selector 340. In some implementations, the way field selector 340 may be implemented as a multiplexer. The plurality of way field generators may include a first way field generator 320 and a second way field generator 330, without being limited thereto. In some implementations, at least three way field generators may be included in the way selector 300 according to the number of banks and a power control signal.

The hash function 310 may output a selection signal SEL indicating to select any one way field generator, from among the plurality of way field generators (e.g., the first way field generator 320 and the second way field generator 330), based on an address ADD and a target TGT. According to some implementations, the hash function 310 may receive a tag field and an index field of the address ADD and output the selection signal SEL. In some implementations, the hash function 310 may be the same as a first hash function 211 of a cache controller 210. When the address ADD is a first address ADDai, the selection signal SEL may be a first value. When the selection signal SEL is the first value, values output by each of first registers 321 and 331 may be selected. When the address ADD is a second address ADDbi, the selection signal SEL may be a second value. When the selection signal SEL is the second value, values output by each of second registers 322 and 332 may be selected.

The first way field generator 320 and the second way field generator 330 may output values of previously stored way fields. In some implementations, each of the first way field generator 320 and the second way field generator 330 may include a plurality of registers and a register selector. The number of registers may be two, without being limited thereto. In some implementations, at least three registers may be included in each way field generator according to the number of banks and a power control signal.

The first way field generator 320 may generate a way field for mapping the first address ADDai to a first bank 230_1 and mapping the second address ADDbi to a second bank 230_2. In some implementations, the first way field generator 320 may include a first register 321, a second register 322, and a register selector 323. In some implementations, the register selector 323 may be implemented as a multiplexer. The first register 321 may store values of a way field WF11 for mapping the first address ADDai to the first bank 230_1 and output the values of the way field WF11 to the register selector 323. The second register 322 may store values of a way field WF12 for mapping the second address ADDbi to a second bank 230_2 and output the values of the way field WF12 to the register selector 323. In some implementations, values of each of the way fields WF11 and WF12 may be bit values b4, b3, b2, and b1. Each of bit value may indicate whether each way is masked. The bit values b4, b3, b2, and b1 may be configured in various forms of, for example, '0001,' '0011,' '0111,' and '1111.' The bit value b4 may indicate whether the fourth way WAY4 is masked, the bit value b3 may indicate whether the third way WAY3 is masked, the bit value b2 may indicate whether the second way WAY2 is masked, and the bit value b1 may indicate whether the first way WAY1 is masked. For example, '0001' may indicate that the second to fourth ways WAY2, WAY3, and WAY4 are masked, and the first way WAY1 is unmasked. In some implementations in which the way selector 300 is included in the second bank 230_2, the first register 321 may be omitted. In some implementations, the way field WF12 may have values indicating that all of the first to fourth ways WAY1, WAY2, WAY3, and WAY4 are unmasked. The register selector 323 may select output values of the first register 321 or the second register 322 in response to the selection signal SEL. For example, when the selection signal SEL has the first value, the register selector 323 may output values of the way field WF11 stored in the first register 321. When the selection signal SEL has the second value, the register selector 323 may output values of the way field WF12 stored in the second register 322.

The second way field generator 330 may generate a way field for mapping the first address ADDai to some ways (e.g., the third and fourth ways WAY3 and WAY4) predefined in the second bank 230_2 and mapping the second address ADDbi to ways (e.g., the first to fourth ways WAY1, WAY2, WAY3, and WAY4) of the second bank 230_2. In some implementations, the second way field generator 330 may include a first register 331, a second register 332, and a register selector 333. In some implementations, the register selector 333 may be implemented as a multiplexer. The first register 331 may store values of a way field WF21 for mapping the first address ADDai to some predefined ways and output the values of the way field WF21 to the register selector 333. The second register 332 may store values of a way field WF22 for mapping the second address ADDbi to the second bank 230_2 and output values of the way field WF22 to the register selector 333. In some implementations, the values of each of the way fields WF21 and WF22 may be the bit values b4, b3, b2, and b1, each of which indicates each way is masked. For example, the bit values b4, b3, b2, and b1 of the way field WF21 may correspond to "1100," and the bit values b4, b3, b2, b1 of the way field WF22 may correspond to "1111." However, the present disclosure is not limited thereto, and bit values may be set by using various design methods. The register selector 333 may select output values of the first register 331 or the second register 332 in response to the selection signal SEL.

The way field selector 340 may select output values of the first way field generator 320 or the second way field generator 330 as a way field WR in response to a power control signal PCS. For example, when the power control signal PCS is a first power control signal PCS1, the way field selector 340 may output output values of the first way field generator 320. The first power control signal PCS1 may indicate to supply power to the first and second banks 230_1 and 230_2. When the power control signal PCS is a second power control signal PCS2, the way field selector 340 may output output values of the second way field generator 330. The second power control signal PCS2 may indicate to supply power only to the second bank 230_2.

Although not shown, in some implementations, like the cache controller 210, the way selector 300 may select any one of a plurality of hash functions in response to the power control signal PCS, and output way information based on the selected hash function and the address ADD.

Figure 14:
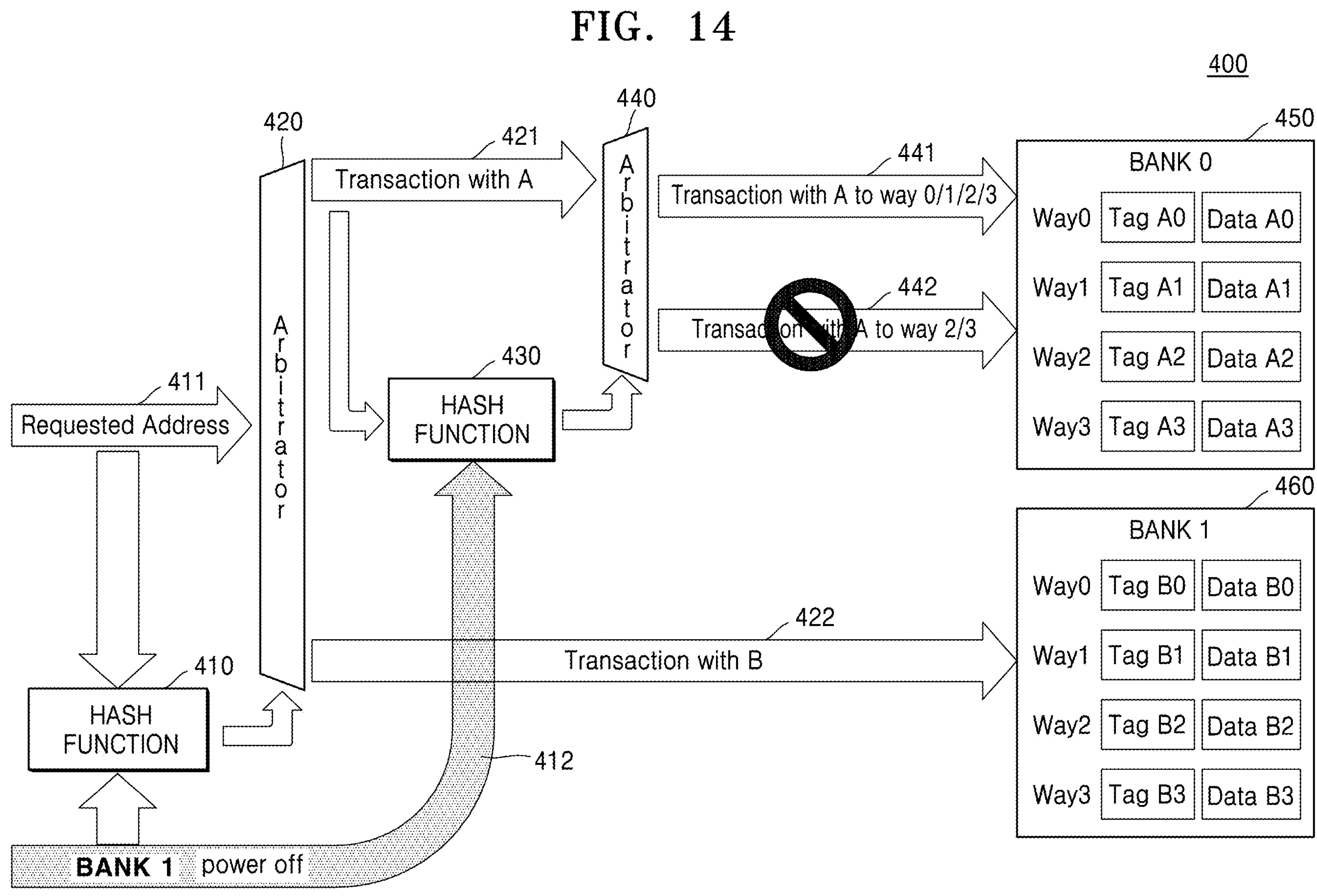

FIGS. 14, 15, and 16 are diagrams illustrating operations of an example of an electronic device 400.

Referring to FIGS. 14, 15, and 16, the electronic device 400 may include a cache to which a bank structure is applied. The cache included in the electronic device 400 may include a plurality of hash functions (e.g., 410 and 430), a plurality of arbitrators (e.g., 420 and 440), and a plurality of banks (e.g., 450 and 460). According to some implementations, the hash function 410 and the arbitrator 420 may be implemented outside the cache. The cache included in the electronic device 400 may perform hash functioning, based on an address of a cache line, by using a request arbitration logic and determine a bank to which the address or the cache line is allocated. Accordingly, banks to which addresses or cache lines are allocated may be distinguished from each other according to an address pattern. When some banks are powered off, the request arbitration logic may be changed such that cache lines allocated to the powered-off bank are allocated to another bank that is powered on. In this case, by flushing cache lines of a bank to be powered off, changed information may be updated in the cache. When the powered-off bank is powered on again, the request arbitration logic may be restored to an original state such that an address is allocated to the other bank that is previously powered on. From among the cache lines of the other bank that is previously powered on, cache lines to be allocated to a newly powered-on bank may need to be flushed to subsequently ensure a normal operation of the cache. Because the complexity of an operation of searching the cache lines may be high, a method of flushing all powered-on banks may be used to reduce the complexity. The banks may be selected based on a result obtained by applying a value of the address to hash functions hardwired to a CPU slave and a master port. For example, a mode in which only one bank is powered on, a mode in which only half of the banks are powered on, or a mode in which all the banks are powered on may be selected. From among hash functions hardwired to the CPU slave and the master port in a replacement logic included in a specific bank, a result of a specific hash function may indicate a bank different from the specific bank according to the selected mode. In this case, only defined ways may be selected.

Referring to FIG. 14, when a requested address 411 of a transaction is input into the hash function 410, the hash function 410 and the arbitrator 420 may determine whether the transaction is arbitrated by a bank 0 450 or a bank 1 460. In some implementations, the hash function 410 and the arbitrator 420 may be included in the cache controller 121 of FIG. 1. However, the present disclosure is not limited thereto. In some implementations, the hash function 410 and the arbitrator 420 may be implemented in a bridge of the electronic device 400. By the hash function 410 and the arbitrator 420, an address group A 421 may be arbitrated by and transmitted to the bank 0 450, and an address group B 422 may be arbitrated by and transmitted to the bank 1 460. The address group A 421 arbitrated by the bank 0 450 may be arbitrated once again by the hash function 430 and the arbitrator 440. When the bank 1 460 remains powered on, an address group A 441 may be allocated to all ways (i.e., Way0, Way1, Way2, and Way3) included in the bank 0 450. An address group B 442 may not be allocated to the bank 0 450. When information 412 indicating to power off the bank 1 460 is input into the electronic device 400, cache lines stored in the bank 1 460 may be flushed.

Referring to FIG. 15, information 412 indicating that the bank 1 460 is powered off may be transmitted to the hash function 410 and the hash function 430. An address group B 424 may not be arbitrated by the bank 1 460 but may be arbitrated by and transmitted to the bank 0 450 without being transmitted to the bank 1 460. That is, the address group A and the address group B 423 may be arbitrated by and transmitted to the bank 0 450. By the hash function 430 and the arbitrator 440, an address group A 441 may be allocated to all the ways (i.e., Way0, Way1, Way2, and Way3) included in the bank 0 450, and an address group B 443 may be allocated to some predefined ways Way2 and Way3. The address group B 443 may be managed only in the some ways Way2 and Way3.

Referring to FIG. 16, information 413 indicating to power on the bank 1 460 may be input into the electronic device 400. In this case, because the hash function 410 and the arbitrator 420 may no longer transmit the address group B 442 to the bank 0 450, all cache lines corresponding to the address group B 442, from among all cache lines stored in the bank 0 450, may need to be flushed. For example, only cache lines stored in the some predefined ways Way2 and Way3 may be read. It may be checked via a tag whether addresses stored in the cache lines correspond to the address group B. Also, the cache lines may be flushed. However, the present disclosure is not limited thereto, and a process of checking the addresses using the tag may be omitted to increase processing speed.

According to the above-described implementations, the number of ways for allocating cache lines to banks other than a specific bank may be preset, and only the predefined ways in the other banks when the specific bank transitions from a power-off state to a power-on state are flushed. Thus, the effect of reducing performance degradation, the effect of reducing a response time, and the effect of reducing a flush operation time, and the effect of reducing power consumption may be obtained.

FIG. 17 is a flowchart illustrating an example of a cache hit operation and a cache miss operation.

Referring to FIG. 17, in operation S310, a memory device may receive transaction requests. In operation S320, the memory device may check a cache hit/cache miss. In operation S330, the memory device may determine whether a transaction request is the cache hit. When the transaction request is the cache hit (S330, Yes), in operation S340, the memory device may process the transaction request for a cache line hit. When the transaction request is the cache miss (S330, No), in operation S350, the memory device may check an address group by using a hash function used when all banks are powered on. In operation S360, the memory device may determine whether an address group of the transaction request is an address group for the bank. When the address group of the transaction request is the address group for the bank (S360, Yes), in operation S370, the memory device may select a victim line based on all ways. The victim line may be a cache line in which data stored in a memory or storage in a lower layer is to be stored, when the cache miss occurs. When the address group of the transaction request is not the address group for the bank (S360, No), the memory device may select a victim line based on predefined ways. In operation S390, the memory device may perform a cache miss operation on the selected victim line.

Figure 18:
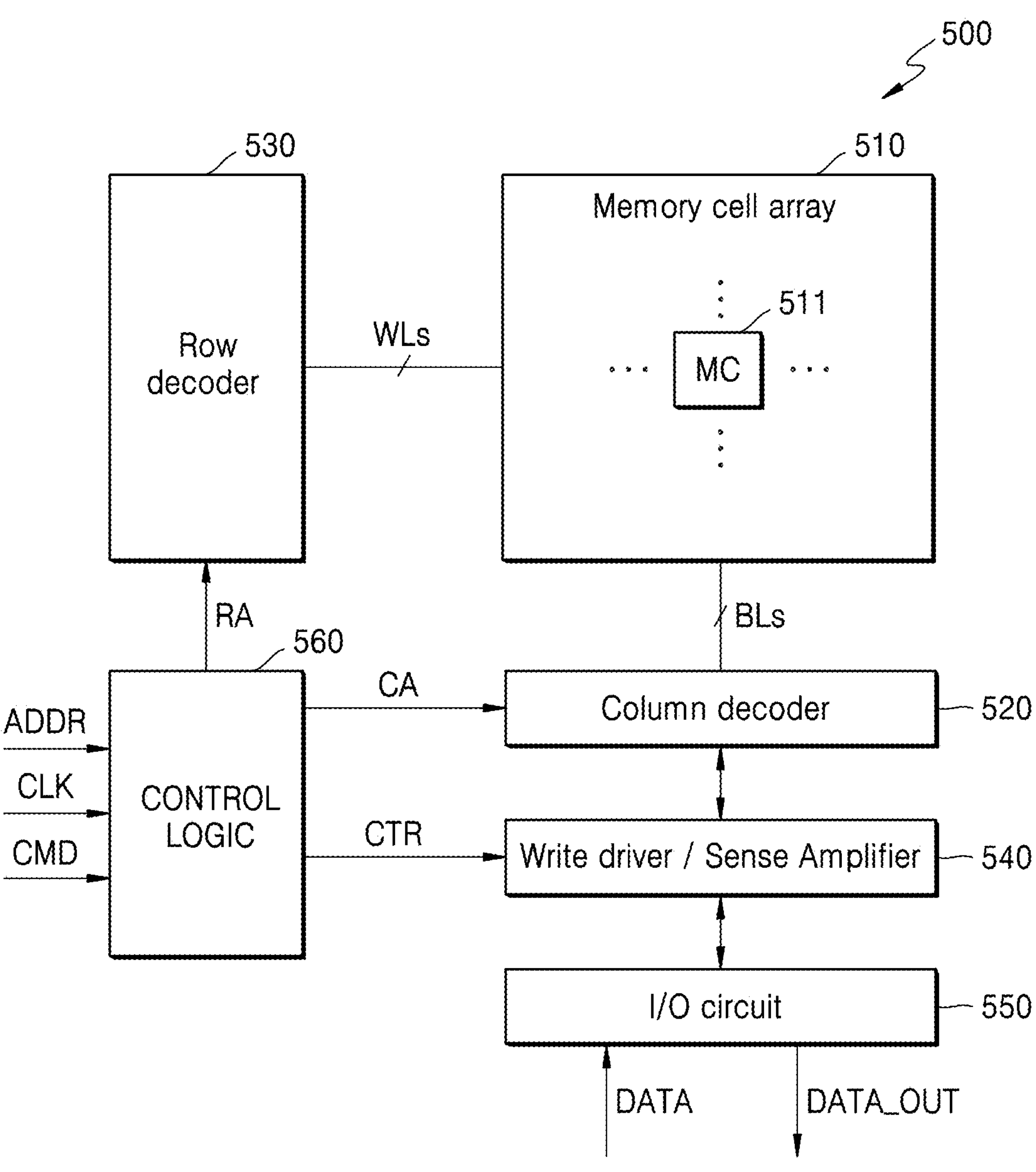
FIG. 18 is a block diagram of an example of a bank.

FIG. 18 is a block diagram of an example of a bank.

Referring to FIG. 18, in a write operation, a bank 500 may receive a command CMD, an address ADDR, a clock CLK, and input data DATA_IN. For example, the bank 500 may receive a command CMD, which is a write command, the address ADDR, and input data DATA_IN, and the input data DATA_IN may be stored in a memory cell area corresponding to the address ADDR in a memory cell array 510. In a read operation, the bank 500 may receive the command CMD, the address ADDR, and the clock CLK. For example, the bank 500 may receive a command CMD, which is a read command, and the address ADDR, read data stored in a memory cell area corresponding to the address ADDR, and output the read data as output data DATA_OUT to the outside.

In some implementations, the bank 500 may include a memory cell array 510, a column decoder 520, a row decoder 530, a write driver/sense amplifier 540, an input/output (I/O) circuit 550, and a control logic 560.

The memory cell array 510 may include a plurality of memory cells (MC) 511. The plurality of memory cells 511 may be at intersections between word lines WLs and bit lines BLs. The column decoder 520 may select at least one bit line out of a plurality of bit lines BLs, based on a column address CA. The row decoder 530 may activate at least one word line out of a plurality of word lines WLs, based on a row address RA. That is, the row decoder 530 may select at least one word line, out of a plurality of word lines WLs.

In a write operation, the write driver/sense amplifier 540 may transmit the input data DATA_IN received from the I/O circuit 550 to the column decoder 520. Alternatively, in a read operation, the write driver/sense amplifier 540 may transmit output data DATA_OUT to the I/O circuit 550 by amplifying the data received from the column decoder 520. The I/O circuit 550 may transmit the input data DATA_IN to the write driver/sense amplifier 540. Alternatively, the I/O circuit 550 may output the output data DATA_OUT received from the write driver/sense amplifier 540.

Figure 19:
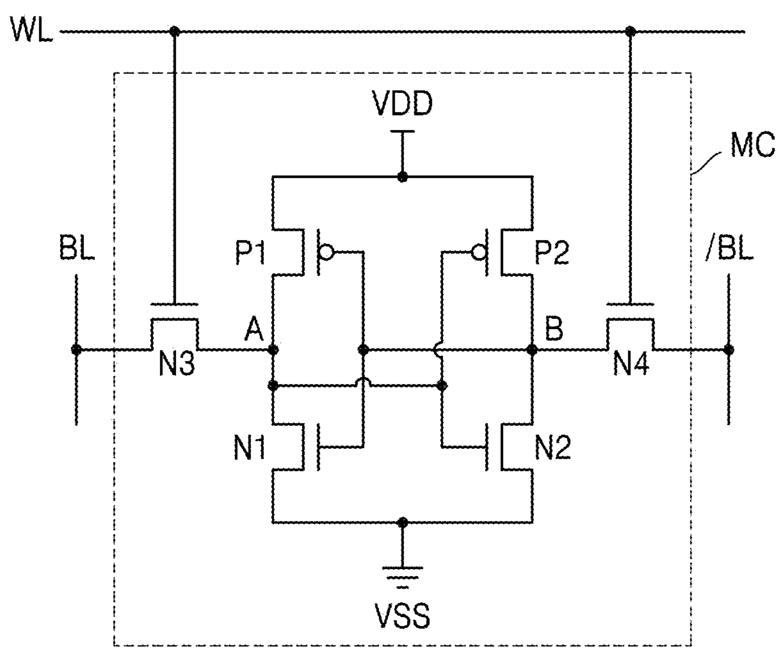
FIG. 19 is a circuit diagram of an example of a memory cell.

The control logic 560 may receive a command CMD, an address ADDR, and a clock CLK and generate a row address RA, a column address CA, and a control signal CTR. For example, the control logic 560 may identify a read command by decoding the command CMD, and generate the row address RA, the column address CA, and the control signal CTR to read the output data DATA_OUT from the memory cell array 510. Also, the control logic 560 may identify a write command by decoding the command CMD, and generate the row address RA, the column address CA, and the control signal CTR to write the input data DATA_IN to the memory cell array 510. FIG. 19 is a circuit diagram of an example of a memory cell.

Referring to FIG. 19, when a bank 500 is included in SRAM, a memory cell MC may be an SRAM cell including six transistors. The memory cell MC may be referred to as a 6T SRAM cell. The memory cell MC may include first and second PMOS transistors P1 and P2 and first to fourth NMOS transistors N1, N2, N3, and N4. The first PMOS transistor P1 may be connected to a power supply voltage (VDD) line and a first node A, and the second PMOS transistor P2 may be connected between the VDD line and a second node B. The first NMOS transistor N1 may be connected between a ground voltage (VSS) line and the first node A, and the second NMOS transistor N2 may be connected between the ground voltage VSS and the second node B. The first node A may be connected to a gate of each of the second PMOS transistor P2 and the second NMOS transistor N2. The second node B may be connected to a gate of each of the first PMOS transistor P1 and the first NMOS transistor N1. The first node A and the second node B may be respectively connected to a bit line BL and a complementary bit line/BL by the third and fourth NMOS transistors N3 and N4. Gates of the third and fourth NMOS transistors N3 and N4 may be word lines WL. The third and fourth NMOS transistors N3 and N4 may be referred to as access transistors or pass transistors. The memory cell MC may store data and complementary data in the first node A and the second node B and maintain the data and complementary data in a latched state. Specifically, when the word line WL is enabled in a write operation, data and complementary data transmitted to the bit line BL and the complementary bit line/BL through the third and fourth NMOS transistors N3 and N4 may be respectively latched in the first node A and the second node B. In the memory cell MC, when the word line WL is enabled in a read operation, the data latched in the first node A and the second node B may be respectively transmitted to the bit line BL and the complementary bit line/BL through the third and fourth NMOS transistors N3 and N4. In some implementations, the memory cell MC may include a first inverter and a second inverter. The first inverter may be formed by the first PMOS transistor P1 and the first NMOS transistor N1. The second inverter may be formed by the second PMOS transistor P2 and the second NMOS transistor N2.

Figure 20:
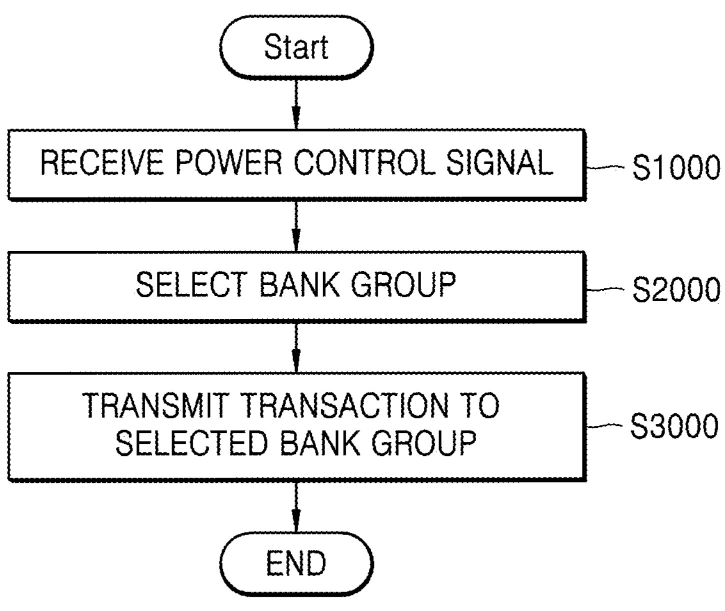
FIG. 20 is a flowchart of an example of an operating method of an electronic device.

FIG. 20 is a flowchart illustrating an example of an operating method of an electronic device.

Referring to FIG. 20, the operating method of the electronic device may include receiving a power control signal (S1000), selecting a bank group (S2000), and transmit a transaction to the selected bank group (S3000).

In operation S1000, the electronic device may receive the power control signal indicating whether to supply power to a first bank group including at least one of a plurality of banks that are independently operable.

In operation S2000, the electronic device may select the first bank group or a second bank group including the remaining banks other than the first bank group among the plurality of banks, based on a transaction including an address and the power control signal.

In operation S3000, the electronic device may transmit the transaction to the selected bank group, based on the transaction and the power control signal.

In some implementations, in operation S1000, a first power control signal indicating to stop supplying power to the first bank group may be transmitted to the memory device 120. Operation S2000 may include an operation in which the memory device 120 outputs a target indicating at least one bank included in the second bank group, based on a first transaction including a first address corresponding to the first bank group and a first power control signal and an operation in which the memory device 120 selects a way included in at least one bank of the second bank group, based on the first transaction and the target. In this case, the operating method of the electronic device may further include flushing the first bank group.

In some implementations, in operation S1000, a second power control signal indicating to supply power to the first bank group may be transmitted to the memory device 120. Operation S2000 may include an operation in which the memory device 120 outputs a target indicating at least one bank included in the first bank group, based on the first transaction including the first address corresponding to the first bank group and the second power control signal, and an operation in which the memory device 120 selects a way included in at least one bank of the first bank group, based on the first transaction and the target. In this case, the operating method of the electronic device may further include flushing the second bank group.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been shown and described with reference to implementations thereof, it will be understood that various changes in form and details may be made therein without departing from the spirit and scope of the following claims.

What is claimed is:

1. A memory device comprising:

a first bank comprising a first way group, the first way group configured to
 receive power, and
 store a first cache line corresponding to a first address;
a second bank comprising a second way group, the second way group configured to
 receive power, and
 store a second cache line corresponding to a second address;
a cache controller configured to
 generate, based on a power control signal and the first address, a second target indicating the second bank, the power control signal indicating to stop supplying the power to the first bank, and
 transmit the second target to a way selector; and
the way selector configured to transmit the first address to the second bank based on the first address, the power control signal, and the second target.

2. The memory device of claim 1, wherein the cache controller comprises:

a first hash function configured to
 receive the first address,
 output a first target indicating the first bank,
 receive the second address, and
 output the second target; and
a second hash function configured to output the second target,
wherein, between the first hash function and the second hash function, the second hash function is further configured to be selected based on the power control signal.

3. The memory device of claim 1, wherein the way selector comprises:

a hash function configured to
 receive the first address, and
 output a selection signal;
a first way field generator configured to output a first way field that maps, based on the selection signal, the first address to the first way group and that maps, based on the selection signal, the second address to the second way group;
a second way field generator configured to output a second way field that maps, based on the selection signal, the first address to some predefined ways of the second way group and that maps, based on the selection signal, the second address to the second way group; and
a way field selector configured to output one of the first way field and the second way field based on a value of the power control signal.

4. The memory device of claim 3, wherein the first way field generator comprises:

a first register configured to store a first plurality of bit values, the first plurality of bit values comprising mapping information between the first address and the first way group;

a second register configured to store a second plurality of bit values, the second plurality of bit values comprising mapping information between the second address and the second way group; and a register selector configured to output, based on a value of the selection signal, the first plurality of bit values or the second plurality of bit values.

5. The memory device of claim 3, wherein the second way field generator comprises:

a first register configured to store a first plurality of bit values, the first plurality of bit values comprising mapping information between the first address and the some predefined ways;

a second register configured to store a second plurality of bit values, the second plurality of bit values comprising mapping information between the second address and the second way group; and a register selector configured to output, based on a value of the selection signal, the first plurality of bit values or the second plurality of bit values.

6. The memory device of claim 1, wherein the cache controller is further configured to control the first bank to flush the first cache line based on the power control signal.

7. The memory device of claim 1, wherein the cache controller is further configured to output the second target to the way selector based on the second address, and wherein the way selector is further configured to transmit the second address to the second bank to access the second bank based on the second target.

8. The memory device of claim 1, wherein the second bank includes the way selector.

9. A memory device comprising:

a first bank comprising a first way group;

a second bank comprising a second way group, the second way group being configured to receive power, and store a first cache line and a second cache line, the first cache line corresponding to a first address and the second cache line corresponding to a second address;

a cache controller configured to generate, based on a power control signal and the first address, a first target indicating the first bank, the power control signal indicating to supply the power to the first bank, and transmit the first target to a way selector; and the way selector configured to transmit the first address to the first bank based on the first address, the power control signal, and the first target.

10. The memory device of claim 9, wherein the cache controller is further configured to control the first bank to invalidate a plurality of cache lines based on the power control signal, the plurality of cache lines being stored in the first way group.

11. The memory device of claim 9, wherein the cache controller is further configured to control the second bank to flush at least one cache line based on the power control signal, the at least one cache line being in the second way group.

12. The memory device of claim 11, wherein the cache controller is further configured to control the second bank to flush all cache lines in the second way group.

13. The memory device of claim 11, wherein the cache controller is further configured to control the second bank to flush the first cache line.

14. The memory device of claim 9, wherein the cache controller comprises:

a first hash function configured to receive the first address, output the first target, receive the second address, and output a second target indicating the second bank; and a second hash function configured to output the second target, and wherein the cache controller is further configured to select the first hash function based on the power control signal.

15. The memory device of claim 9, wherein the way selector comprises:

a hash function configured to receive the first address, and output a selection signal;

a first way field generator configured to output a first way field that maps, based on the selection signal, the first address to the first bank and that maps, based on the selection signal, the second address to the second bank;

a second way field generator configured to output a second way field that maps, based on the selection signal, the first address to some predefined ways of the second way group and that maps, based on the selection signal, the second address to the second way group; and a way field selector configured to output the first way field or the second way field based on a value of the power control signal.

16. An operating method of a memory device, the method comprising:

receiving a power control signal, the power control signal indicating whether to supply power to a first bank group, the first bank group comprising at least one bank of a plurality of banks, the plurality of banks being capable of operating independently;

generating, based on a transaction and the power control signal, a target indicating at least one first bank in the first bank group or at least one second bank in a second bank group, the transaction comprising an address, the second bank group comprising at least one bank configured to receive power, and the at least one bank of the second bank group being among the plurality of banks and different from the at least one bank of the first bank group;

selecting, based on the transaction and the target, the first bank group or the second bank group; and transmitting, based on the transaction and the power control signal, the transaction to the selected bank group.

17. The method of claim 16, wherein the power control signal indicates to supply the power to the first bank group, the target indicates the at least one first bank in the first bank group, and the address corresponds to the first bank group, and wherein selecting the first bank group or the second bank group comprises:

selecting, based on the transaction and the target, a way included in the at least one first bank in the first bank group.

18. The method of claim 17, comprising flushing the second bank group.

19. The method of claim 16, wherein the power control signal indicates to stop supplying the power to the first bank group, the target indicates the at least one second bank in the second bank group, and the address corresponds to the first bank group, and wherein selecting the first bank group or the second bank group comprises:

selecting, based on the first-transaction and the target, a way included in the at least one second bank in the second bank group.

20. The method of claim 19, comprising flushing the first bank group.

* * * * *